(12) United States Patent
Ichikawa

(10) Patent No.: US 11,770,079 B2
(45) Date of Patent: Sep. 26, 2023

(54) ELECTRIC WORKING MACHINE

(71) Applicant: MAKITA CORPORATION, Anjo (JP)

(72) Inventor: Yoshitaka Ichikawa, Anjo (JP)

(73) Assignee: MAKITA CORPORATION, Anjo (JP)

(*) Notice: Subject to any disclaimer, the term of this patent is extended or adjusted under 35 U.S.C. 154(b) by 0 days.

(21) Appl. No.: 17/889,109

(22) Filed: Aug. 16, 2022

(65) Prior Publication Data

US 2022/0393619 A1 Dec. 8, 2022

Related U.S. Application Data

(63) Continuation of application No. 17/015,158, filed on Sep. 9, 2020, now Pat. No. 11,463,027.

(30) Foreign Application Priority Data

Sep. 20, 2019 (JP) ................... 2019-172073

(51) Int. Cl.
*H02J 7/00* (2006.01)
*H02P 1/12* (2006.01)
*H02P 29/00* (2016.01)
*H01M 10/48* (2006.01)

(52) U.S. Cl.
CPC .............. *H02P 1/12* (2013.01); *H01M 10/48* (2013.01); *H02J 7/0063* (2013.01); *H02J 7/00712* (2020.01); *H02P 29/0016* (2013.01); *H02P 2209/09* (2013.01)

(58) Field of Classification Search
CPC .. H02J 7/00304; H02J 7/00712; H02J 7/0063; H02J 7/007188; H02P 1/12; H02P 29/0016; H02P 2209/09; H01M 10/48
See application file for complete search history.

(56) References Cited

U.S. PATENT DOCUMENTS

| | | |
|---|---|---|
| 5,977,732 A | 11/1999 | Matsumoto |
| 2010/0308764 A1 | 12/2010 | Suzuki et al. |
| 2012/0247796 A1 | 10/2012 | Mueller et al. |
| 2013/0043817 A1 | 2/2013 | Shibuya et al. |
| 2014/0265606 A1 | 9/2014 | Gazit |
| 2015/0084554 A1 | 3/2015 | Tsuruta et al. |
| 2015/0145444 A1 | 5/2015 | Reed et al. |
| 2015/0231770 A1 | 8/2015 | Kusakawa et al. |

(Continued)

FOREIGN PATENT DOCUMENTS

| | | |
|---|---|---|
| CN | 101911468 A | 12/2010 |
| CN | 102729220 A | 10/2012 |

(Continued)

OTHER PUBLICATIONS

May 9, 2023 Office Action issued in Japanese Patent Application No. 2019-172073.

(Continued)

*Primary Examiner* — Cortez M Cook
(74) *Attorney, Agent, or Firm* — Oliff PLC

(57) ABSTRACT

An electric working machine in one aspect of the present disclosure includes a motor and a controller. The motor is configured to be electrically coupled to a battery pack and to be driven with electric power from the battery pack. The controller is configured to acquire an internal resistance information of the battery pack and to change control of the motor based on the internal resistance information acquired.

8 Claims, 20 Drawing Sheets

(56) References Cited

U.S. PATENT DOCUMENTS

| | | | |
|---|---|---|---|
| 2015/0357853 A1* | 12/2015 | Suzuki | H02J 7/00304 |
| | | | 318/139 |
| 2016/0359343 A1* | 12/2016 | Ito | H02J 7/0029 |
| 2017/0129090 A1 | 5/2017 | Yamamoto | |
| 2017/0144563 A1* | 5/2017 | Lim | H02J 7/007188 |
| 2018/0048252 A1 | 2/2018 | Yabuguchi et al. | |
| 2018/0297179 A1 | 10/2018 | Osada et al. | |
| 2018/0345433 A1 | 12/2018 | Sudo et al. | |
| 2019/0111550 A1 | 4/2019 | Kato et al. | |

FOREIGN PATENT DOCUMENTS

| | | |
|---|---|---|
| CN | 103659749 A | 3/2014 |
| CN | 106921315 A | 7/2017 |
| CN | 108290279 A | 7/2018 |
| CN | 108724111 A | 11/2018 |
| CN | 109664231 A | 4/2019 |
| EP | 2724823 A1 | 4/2014 |
| JP | H05-67195 U | 9/1993 |
| JP | 2005-131770 A | 5/2005 |
| JP | 2013-211980 A | 10/2013 |
| JP | 2014-054708 A | 3/2014 |
| JP | 2015-062981 A | 4/2015 |

OTHER PUBLICATIONS

Apr. 15, 2023 Office Action issued in Chinese Patent Application No. 202010972779.9.

Page 19 from Ocean University of China Press, Jun. 2016.

\* cited by examiner

| | OVERLOAD MAP | INTERNAL RESISTANCE VALUE | THRESHOLD VALUE OF OVERCURRENT |
|---|---|---|---|
| WAITING FOR AUTHENTICATION (DURING AUTHENTICATION) | INITIAL SETTING LEVEL | LOWEST VALUE (150 mΩ) | LOWEST VALUE (80 A) |
| AUTHENTICATION IS FAILED | MAXIMUM DETERIORATION LEVEL | LOWEST VALUE (150 mΩ) | LOWEST VALUE (80 A) |
| AUTHENTICATION IS SUCCESSFUL | COMMUNICATION ACQUISITION | COMMUNICATION ACQUISITION (200 mΩ 以上) | COMMUNICATION ACQUISITION (200 A 以上) |

FIG. 19

ELECTRIC WORKING MACHINE

CROSS-REFERENCE TO RELATED APPLICATIONS

This application is a continuation of U.S. application Ser. No. 17/015,158 filed Sep. 9, 2020, which claims the benefit of Japanese Patent Application No. 2019-172073 filed on Sep. 20, 2019 with the Japan Patent Office, the contents of each of these applications being incorporated herein by reference.

BACKGROUND

The present disclosure relates to an electric working machine.

An electric power tool disclosed in Japanese Unexamined Patent Application Publication No. 2005-131770 is a type of electric working machine that includes a motor driven with electric power from a battery pack.

SUMMARY

In recent years, battery packs have been diversified and there have been a variety of types of battery packs having the same rated voltage. Under these circumstances, some motors stop as they experience overcurrent but some do not stop as they do not experience overcurrent, depending on the combination of the battery pack and the electric working machine. Likewise, some electric working machines may experience a delayed start-up but some may not, depending on the above-described combination. That is to say, some electric working machines do not appropriately operate depending on the combination with the battery pack.

It is preferable in one aspect of the present disclosure to provide an electric working machine that can appropriately operate regardless of which battery pack is combined with.

An electric working machine according to one aspect of the present disclosure includes a connection port, a motor and a controller. The connection port is coupled to the battery pack. The motor is configured to be driven with electric power from the battery pack via the connection port. The controller acquires an internal resistance information related to an internal resistance value of the battery pack, and changes control of the motor based on the internal resistance information acquired.

According to one aspect of the present disclosure, the internal resistance information is acquired and then the control of the motor is changed based on the internal resistance information acquired. The inventor has acquired a knowledge that when a battery pack having a relatively large internal resistance value is coupled to an electric working machine in which control of the motor is adapted for a battery pack having a relatively small internal resistance value, a start-up of the electric working machine may be delayed or output of the electric working machine may decline. The inventor has also acquired a knowledge that when a battery pack having a relatively small internal resistance value is coupled to an electric working machine in which control of the motor is adapted for a battery pack having a relatively large internal resistance value, an excessive current may flow at a start-up of the electric working machine and may result in stopping of the motor. The control of the motor is changed based on the internal resistance information, whereby an appropriate operation of the electric working machine can be achieved.

The control of the motor may include control related to the start-up of the motor.

The control related to the start-up of the motor is changed based on the internal resistance information, whereby stopping of the motor due to an excessive current and a delayed start-up of the motor are suppressed regardless of the internal resistance value of the battery pack, and the motor can be appropriately started.

The controller may be configured to set a startup parameter related to the start-up of the motor based on the internal resistance information.

The startup parameter of the motor is set based on the internal resistance information, whereby the control related to the start-up of the motor can be changed in accordance with the internal resistance information.

A switch for driving the motor may be provided. The controller may perform an open loop control of the motor based on a Pulse Width Modulation (PWM) signal of a command duty ratio. The command duty ratio corresponds to a command value of the PWM signal. The controller may perform a soft start in the open loop control in response to switching of the switch to ON in order to gradually increase the command duty ratio to a target duty ratio. The target duty ratio corresponds to a target value of the duty ratio. The controller may change a first term based on the internal resistance information in the soft start. The first term corresponds to a time period required for the command duty ratio to reach the target duty ratio in response to switching of the switch to ON.

When the first term is set constant in the soft start, a voltage applied to the motor is increased and a value of a current flowing in the motor is increased in accordance with a decrease in the internal resistance value. Then, the first term is changed based on the internal resistance information in the soft start. This can suppress a flow of an excessive current to the motor regardless of the internal resistance value.

A switch for driving the motor may be provided. The controller may execute a constant rotation speed control to adjust a rotation speed of the motor to be consistent with a command rotation speed. The command rotation speed corresponds to a command value of the rotation speed. The controller may perform a soft start in the constant rotation speed control in response to switching of the switch to ON in order to gradually increase the command rotation speed to a target rotation speed. The target rotation speed corresponds to a target value of the rotation speed. The controller may change a second term based on the internal resistance information in the soft start. The second term corresponds to a time period required for the command rotation speed to reach the target rotation speed in response to switching of the switch to ON.

When the second term is set constant in the soft start, a voltage drop in the battery pack is increased in accordance with the increase in the internal resistance value. A current flowing to the motor is accordingly increased. Then, the second term is changed based on the internal resistance information in the soft start. This can suppress a flow of an excessive current to the motor regardless of the internal resistance value.

The startup parameter may include a first rate of change. The first rate of change corresponds to a rate of change in the command duty ratio.

The first rate of change is changed based on the internal resistance information, whereby the first term can be changed.

The controller may acquire the internal resistance value based on the internal resistance information. The controller may set the first rate of change so that the first rate of change is decreased in accordance with the decrease in the internal resistance value.

With the configuration where the first rate of change is set so that the first rate of change is decreased in accordance with the decrease in the internal resistance value, a sharp increase in current value at the start-up of the motor can be suppressed even when the internal resistance value is relatively small. Consequently, an excessive current at the star-up of the motor can be suppressed even when the internal resistance value is relatively small.

The startup parameter may include a second rate of change. The second rate of change corresponds to a rate of change in the command rotation speed.

The second rate of change is changed based on the internal resistance information, whereby the second term can be changed.

The controller may acquire the internal resistance value based on the internal resistance information. The controller may set the second rate of change so that the second rate of change is decreased in accordance with the increase in the internal resistance value.

With the configuration where the second rate of change is set so that the second rate of change is decreased in accordance with the increase in the internal resistance value, a sharp increase in current value at the start-up of the motor can be suppressed even when the internal resistance value is relatively large. Consequently, an excessive current at the star-up of the motor can be suppressed even when the internal resistance value is relatively large.

The control of the motor may include control related to output restriction of the motor.

The control related to output restriction of the motor is changed based on the internal resistance information. Because of this, output of the motor can be appropriately controlled regardless of the internal resistance value.

The controller may control a discharge current to be equal to or below a set upper limit of the current value. The discharge current flows from the battery pack to the motor. The controller may acquire the internal resistance value based on the internal resistance information. The controller may set a current limit value so that the current limit value is decreased in accordance with the decrease in the internal resistance value.

Since the voltage drop in the battery pack is decreased in accordance with the decrease in the internal resistance value, the voltage applied to the motor is increased in accordance with the decrease in the internal resistance value. Thus, the current limit value is set the current limit value so that the current limit value is decreased in accordance with the decrease in the internal resistance value, whereby output of the motor can be controlled constant regardless of the internal resistance value.

BRIEF DESCRIPTION OF THE DRAWINGS

Example embodiments of the present disclosure will be described hereinafter by way of example with reference to the accompanying drawings, in which:

FIG. 19 is a view showing an overload map, an internal resistance value of the battery pack and a threshold value of overcurrent used in each of cases of waiting for authentication, where authentication is failed and where authentication is successful according to the third embodiment.

DETAILED DESCRIPTION OF EXEMPLARY EMBODIMENTS

First Embodiment

<1-1. Configuration>
<1-1-1. Electrical Configuration of Battery Pack>

Figure 1:
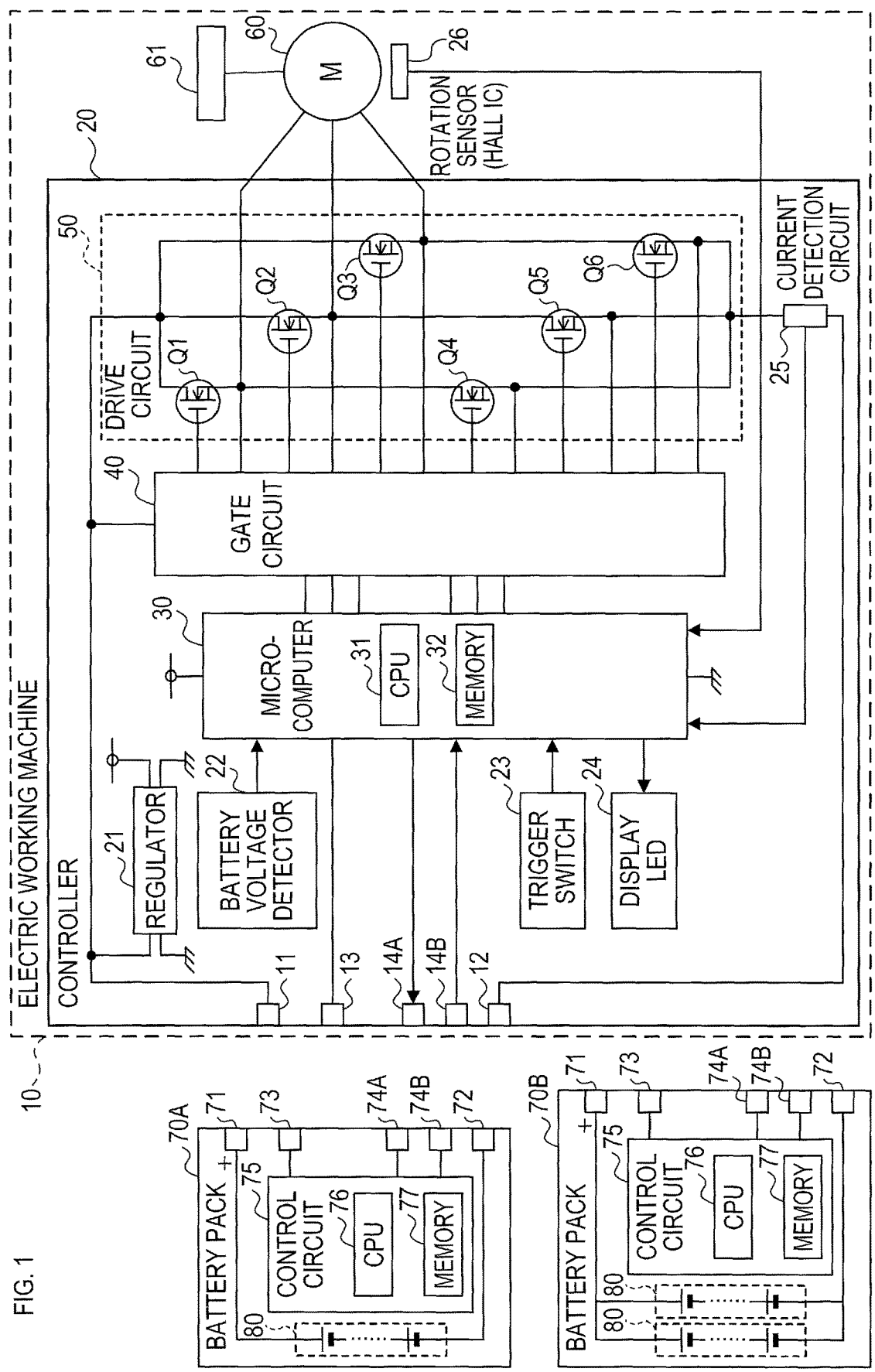
FIG. 1 is a block diagram showing structures of an electric working machine and a battery pack according to a first embodiment.

A description will be given of electrical configurations of a first battery pack 70A and a second battery pack 70B, with reference to FIG. 1. The first, the second battery packs 70A, 70B have the same rated voltage and different internal resistance values. The first, the second battery packs 70A, 70B basically have the same configuration. The first, the second battery packs 70A, 70B are repeatedly chargeable power sources and are, for example, lithium ion secondary batteries.

The first, the second battery packs 70A, 70B, each include: one or more battery blocks 80; a control circuit 75;

a battery positive terminal 71; a battery negative terminal 72; a battery signal terminal 73; and battery serial communication terminals 74A, 74B.

The number of the battery blocks 80 provided in the first battery pack 70A differs from the number of the battery blocks 80 provided in the second battery pack 70B. The configuration of the first battery pack 70A is the same as that of the second battery pack 70B except for the number of the battery blocks 80. Each of the battery blocks 80 includes battery cells coupled in series. Each of positive electrodes of the battery blocks 80 is coupled to the battery positive terminal 71, and each of negative electrodes of the battery blocks 80 is coupled to the battery negative terminal 72.

In the present embodiment, the first battery pack 70A includes a single battery block 80. Meanwhile, the second battery pack 70B includes two battery blocks 80 coupled in parallel. Thus, an internal resistance value of the first battery pack 70A is larger than an internal resistance value of the second battery pack 70B.

The control circuit 75 includes: a CPU 76; and a memory 77. The memory 77 is a semiconductor memory including a volatile memory and a non-volatile memory. The CPU 76 executes various programs stored in the memory 77, thereby executing various processes.

Specifically, the control circuit 75 outputs a discharge permission signal to an electric working machine 10 via the battery signal terminal 73 when the battery block 80 is dischargeable. The control circuit 75 also outputs a discharge prohibition signal to the electric working machine 10 via the battery signal terminal 73 when the battery block 80 is not dischargeable. The discharge permission signal is, for example, a low-level signal, and the discharge prohibition signal is, for example, a high-level signal.

The control circuit 75 executes a full duplex serial communication with the electric working machine 10 via the battery serial communication terminals 74A, 74B. Specifically, the control circuit 75 transmits a serial signal including information of the first, the second battery packs 70A, 70B to the electric working machine 10 via the battery serial communication terminal 74B, and receives a serial signal including information of the electric working machine 1 from the electric working machine 10 via the battery serial communication terminal 74A.

<1-1-2. Electrical Configuration of Electric Working Machine>

A description will be given of an electrical configuration of the electric working machine 10, with reference to FIG. 1. The electric working machine 10 is a working machine, such as an electric power tool and a gardening tool, in which a tip tool is driven by a driving force of a motor. Examples of the electric power tool may include a circular saw, a driver drill, an impact screwdriver, a cleaner, and a hammer drill. Examples of the gardening tool may include a grass cutter, a trimmer, and a blower.

The electric working machine 10 includes: a controller 20; a motor 60; a rotation sensor 26; and a tip tool 61. The electric working machine 10 is driven with electric power from the first battery pack 70A or the second battery pack 70B.

The motor 60 is a three-phase brushless motor. The motor 60 is coupled to the tip tool 61. The tip tool 61 is driven by receiving a rotational force from the motor 60. The rotation sensor 26 includes, for example, a hall IC to detect a rotational position of a rotor of the motor 60. The rotation sensor 26 outputs the detected rotational position of the rotor to a later-described microcomputer 30. The microcomputer 30 calculates a rotation speed of the motor 60 from the rotational position of the rotor obtained from the rotation sensor 26 and a detection time interval.

The controller 20 includes: a positive terminal 11; a negative terminal 12; a signal terminal 13; and serial communication terminals 14A, 14B. The positive terminal 11 is coupled to the battery positive terminal 71. The negative terminal 12 is coupled to the battery negative terminal 72. The signal terminal 13 is coupled to the battery signal terminal 73. The serial communication terminal 14A is coupled to the battery serial communication terminal 74A, and the serial communication terminal 14B is coupled to the battery serial communication terminal 74B.

The controller 20 further includes: a regulator 21; a battery voltage detector 22; a trigger switch 23; a Light Emitting Diode (LED) display 24; a current detection circuit 25; the microcomputer 30; a gate circuit 40; and a drive circuit 50.

The regulator 21 generates a power-supply voltage required for activating the microcomputer 30 (for example, direct-current 5V) by receiving power supply from one or two battery blocks 80 when the first battery pack 70A or the second battery pack 70B is coupled to the electric working machine 10.

The battery voltage detector 22 detects voltage values of the first, the second battery packs 70A, 70B applied between the positive terminal 11 and the negative terminal 12 and outputs the detected voltage values to the microcomputer 30.

The trigger switch 23 is operated by a user of the electric working machine 10 to drive or to stop the motor 60. The trigger switch 23 is switched from OFF to ON when pulled by the user, and then outputs an ON signal to the microcomputer 3. The trigger switch 23 is switched from ON to OFF when released by the user, and then outputs an OFF signal to the microcomputer 30.

The trigger switch 23 is operated by the user to adjust the rotation speed and/or a torque of the motor 60. A pulse-width modulated pulse (that is, a PWM signal) is applied to windings of the motor 60 based on a command duty ratio. The command duty ratio is a command value of each of duty ratios for first to sixth switching devices Q1 to Q6 provided in the later-described drive circuit 50, and generated by the microcomputer 30. A target duty ratio is a target value of the command duty ratio, and is set in accordance with pulling amount of the trigger switch 23 by the user. The user adjusts the pulling amount of the trigger switch 23 depending on how much rotation speed and/or torque the user desires the motor 60 to rotate with. For example, when the user desires the rotation speed of the motor 60 to be relatively low, and/or desires the torque to be relatively small, the pulling amount of the trigger switch 23 is adjusted to be relatively small. When the user desires the rotation speed of the motor 60 to be relatively high, and/or desires the torque to be relatively large, the pulling amount of the trigger switch 23 is adjusted to be relatively large.

A switch and/or a dial other than the trigger switch 23 may be provided for the user to set an operation mode and/or the target duty ratio of the electric working machine 10. The target duty ratio may be set in accordance with the operation mode.

The display LED 24 notifies the user of an operation state and/or failure of the electric working machine 10. The display LED 24 includes a plurality of LEDs to display information such as the operation mode of the electric working machine 10, the rotation speed and a rotational direction of the motor 60, remaining energy of the first, the second battery packs 70A, 70B. Each LED of the display LED 24 is accordingly turned on the light, blinks, or is turned off the light as commanded by the microcomputer 30.

The drive circuit 50 supplies electric current to windings corresponding to the respective phases of the motor 60 by receiving power supply from the first, the second battery packs 70A, 70B. The drive circuit 50 is a three-phase full-bridge circuit including the first to third switching devices Q1 to Q3 at a high side and the fourth to sixth switching devices Q4 to Q6 at a low side. Each of the first to sixth switching devices Q1 to Q6 is, for example, in a form of metal-oxide-semiconductor field-effect transistor (MOSFET), but is not limited to MOSFET.

The gate circuit 40 sequentially supplies electric current to windings of the respective phases of the motor 60 by turning each of the first to sixth switching devices Q1 to Q6 of the drive circuit 50 ON or OFF in accordance with the command duty ratio outputted from the microcomputer 30 to rotate the motor 60. When all the first to sixth switching devices Q1 to Q6 are turned OFF, the motor 60 enters a free-running state. When all of the first to third switching devices Q1 to Q3 are turned OFF and all of the fourth to sixth switching devices Q4 to Q6 are turned ON, the motor 60 enters a state in which a so-called short-circuit braking works on the motor 60.

The current detection circuit 25 is disposed on a negative electrode line extending from a drive circuit 50 to the negative terminal 12, and detects a value of discharge current outputted from the first, the second battery packs 70A, 70B to the motor 60. The current detection circuit 25 outputs the detected value (hereinafter referred to as discharge current value) to the microcomputer 30.

The microcomputer 30 includes: a CPU 31; and a memory 32. The memory 32 is a semiconductor memory including a volatile memory and a non-volatile memory. The CPU 31 executes various programs stored in the memory 32, thereby executing various processes. The processes executed by the microcomputer 30 will be described later.

<1-2. Process>

<1-2-1. Main Process>

Figure 2:
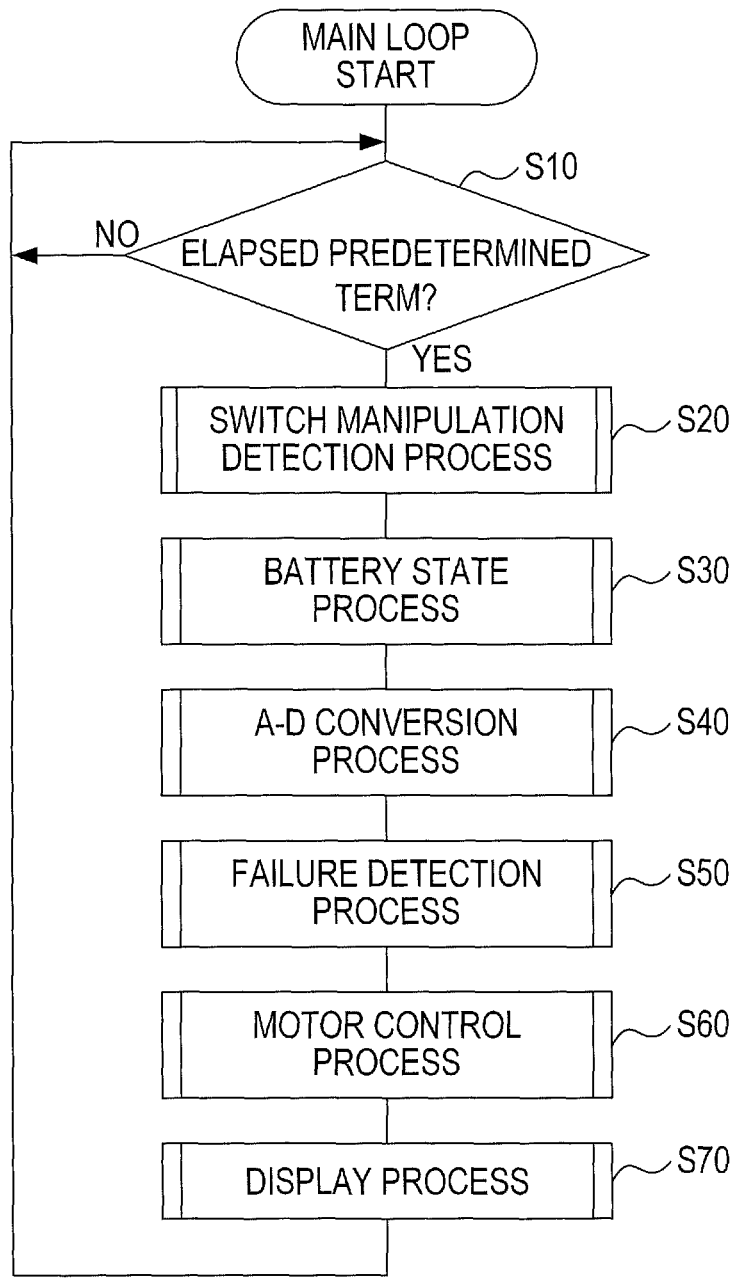
FIG. 2 is a flowchart illustrating a main process executed by a microcomputer according to the first embodiment.

A description will be given of a main process executed by the microcomputer 30 of the electric working machine 10, with reference to the flowchart shown in FIG. 2. The first battery pack 70A or the second battery pack 70B is coupled to the electric working machine 10. Hereinafter, the first battery pack 70A or the second battery pack 70B coupled to the electric working machine 10 will be referred to as a battery pack 70.

In S10, the microcomputer 30 first determines whether or not a predetermined term has elapsed. The microcomputer 30 waits if the predetermined term has not elapsed, but proceeds to process in S20 if the predetermined term has elapsed. The predetermined term corresponds to a cycle for controlling the microcomputer 30.

In S20, the microcomputer 30 executes a switch manipulation detection process. Specifically, the microcomputer 30 detects whether the trigger switch 23 is in an ON state or in an OFF state based on a signal from the trigger switch 23.

In S30, the microcomputer 30 executes a battery state process based on information outputted from the battery pack 70. The battery state process will be detailed later.

In S40, the microcomputer 30 executes an Analog to Digital (A-D) conversion process. Specifically, the microcomputer 30 converts an analog detection signal outputted from the battery voltage detector 22, the current detection circuit 25 or the like, into a digital signal. In this way, the microcomputer 30 acquires a value of the discharge current flowing from the battery pack 70 to the motor 60, the voltage value of the battery pack 70, or the like.

In S50, the microcomputer 30 executes a failure detection process. Specifically, the microcomputer 30 compares the discharge current value, the voltage value or the like acquired in S40 with the respective threshold values, thereby detecting a failure such as an overcurrent and a voltage drop.

In S60, the microcomputer 30 executes a motor control process based on the state of the trigger switch 23, the battery state, and the detection result of the failure. The motor control process will be detailed later.

In S70, the microcomputer 30 executes a display process. Specifically, the microcomputer 30 notifies the user of information such as the operation state of the motor 60, the remaining energy of the battery pack 70, and the detected failure via the display LED 24. Then, the present process is terminated.

<1-2-2. Battery State Process>

Figure 3:
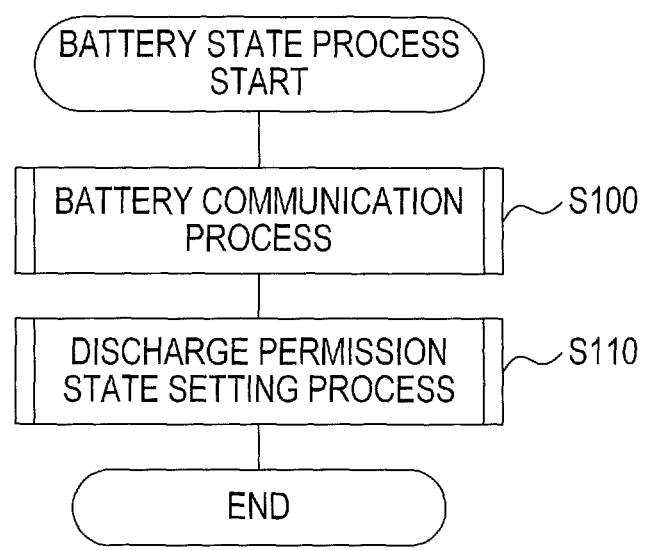
FIG. 3 is a flowchart illustrating a battery state process executed by the microcomputer according to the first embodiment.

Hereinafter, a detailed description will be given of the battery state process executed by the microcomputer 30 in S30, with reference to the flowchart in FIG. 3.

In S100, the microcomputer 30 executes a battery communication process. The battery communication process will be detailed later.

In S110, the microcomputer 30 executes a discharge permission state setting process. Specifically, the microcomputer 30 sets a discharge permission flag upon receiving the discharge permission signal from the battery pack 70 via the signal terminal 13. The microcomputer 30 clears the discharge permission flag upon receiving the discharge prohibition signal via the signal terminal 13. Then, the present process is terminated.

<1-2-3. Battery Communication Process>

Figure 4:
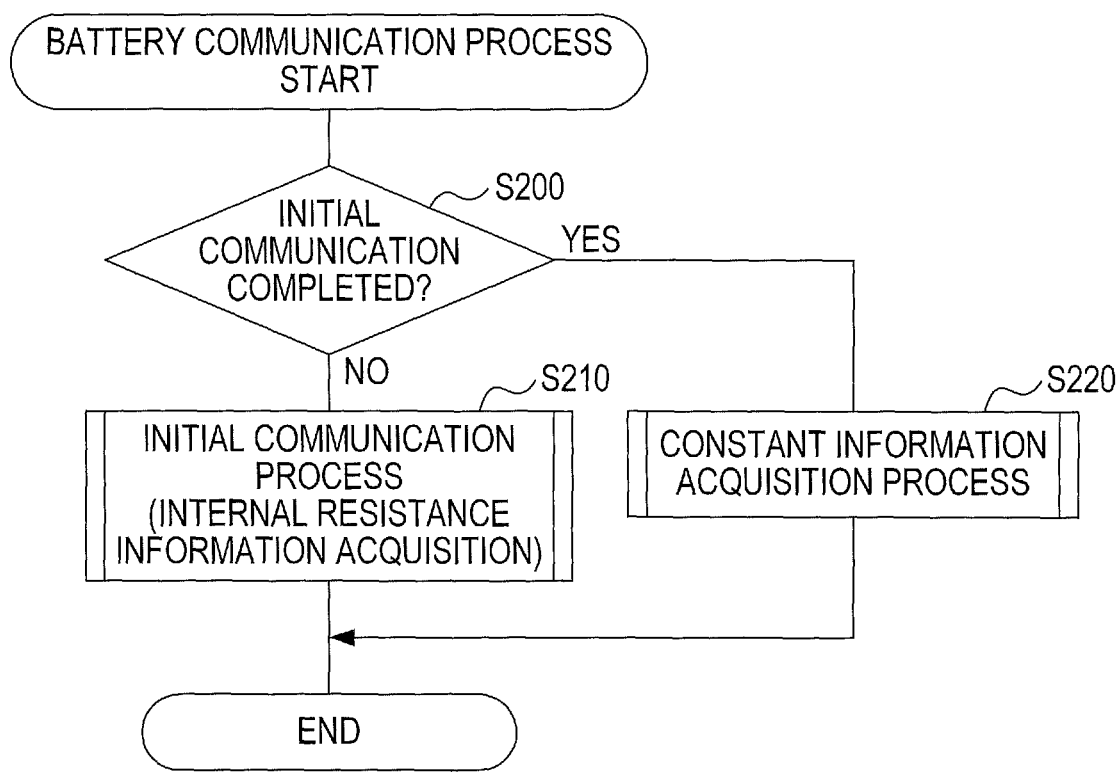
FIG. 4 is a flowchart illustrating a battery communication process according to the first embodiment.

Hereinafter, a detailed description will be given of the battery communication process executed by the microcomputer 30 in S100, with reference to the flowchart in FIG. 4.

In S200, the microcomputer 30 determines whether or not an initial communication is completed. When determining in S200 that the initial communication is not completed, the microcomputer 30 proceeds to process in S210, but when determining that the initial communication is completed, the microcomputer 30 proceeds to process in S220.

In S210, the microcomputer 30 executes an initial communication process. Specifically, the microcomputer 30 transmits information of the electric working machine 10, such as model number of the electric working machine 10, to the battery pack 70 via the serial communication terminal 14A. The microcomputer 30 receives an internal resistance information, a model number of the battery pack 70, or such from the battery pack 70 via the serial communication terminal 14B. The internal resistance information may be the internal resistance value of the battery pack 70 or the number of the battery blocks 80 coupled in parallel. That is to say, the internal resistance information may be the internal resistance value, or information from which the internal resistance value can be calculated or estimated.

Meanwhile, in S220, a constant information acquisition process is executed. Specifically, the microcomputer 30 receives temperature, remaining energy and a later-described overload counter value of the battery pack 70 via the serial communication terminal 14B. Then, the present process is terminated.

<1-2-4. Motor Control Process>

Figure 5:
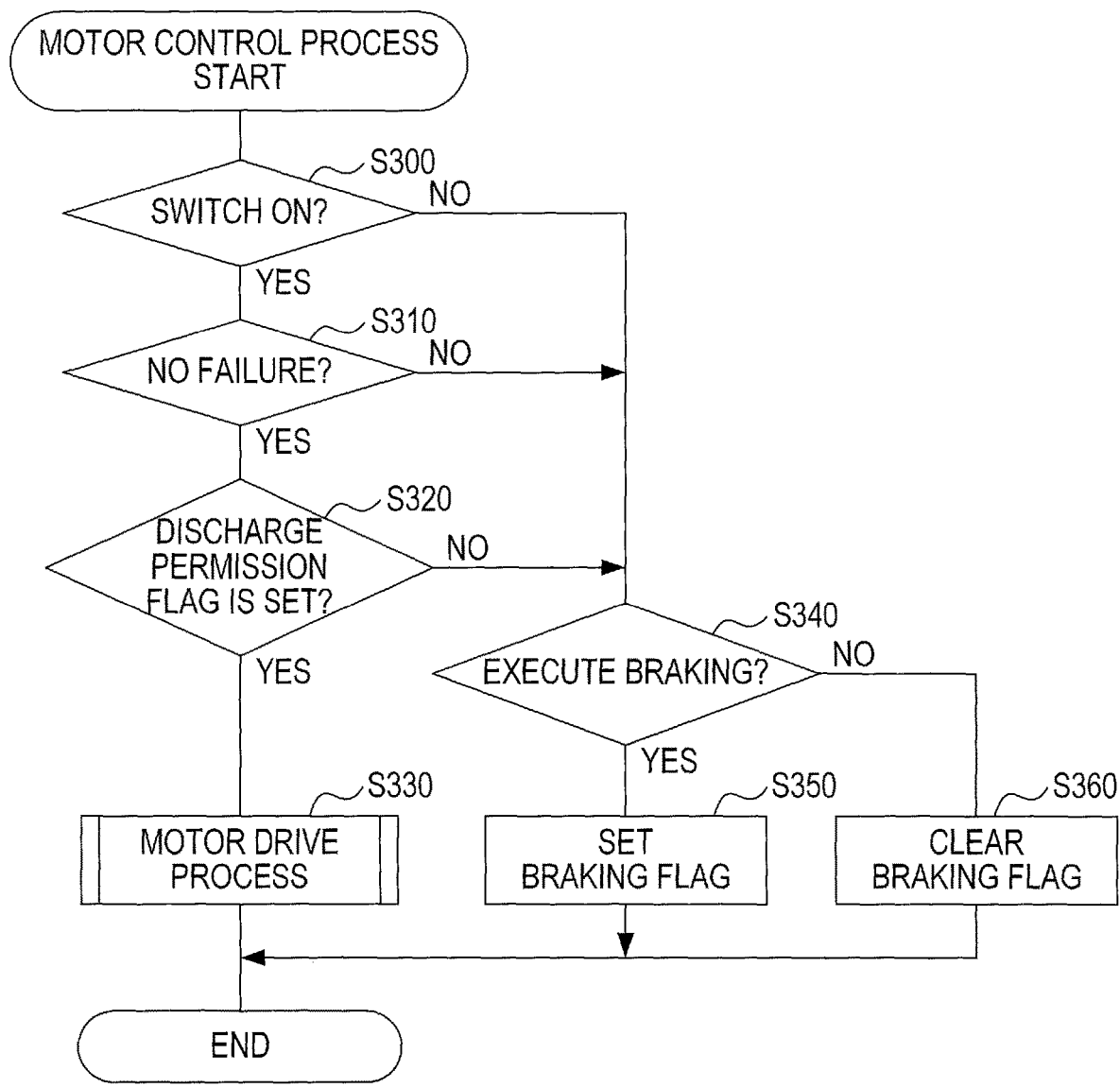
FIG. 5 is a flowchart illustrating a motor control process according to the first embodiment.

Hereinafter, a detailed description will be given of the motor control process executed by the microcomputer 30 in S60, with reference to the flowchart in FIG. 5.

In S300, the microcomputer 30 determines whether or not the trigger switch 23 is in an ON state. When determining that the trigger switch 23 is in the ON state, the microcomputer 30 proceeds to process in S310, but when determining that the trigger switch 23 is in an OFF state, the microcomputer 30 proceeds to process in S340.

In S310, the microcomputer 30 determines whether or not a failure has been detected in S50. When determining that any failure has not been detected, the microcomputer 30 proceeds to process in S320. When determining that a failure has been detected, the microcomputer 30 proceeds to process in S340.

In S320, the microcomputer 30 determines whether or not the discharge permission flag is set. When determining that the discharge permission flag is set, the microcomputer 30 proceeds to process in S330, but when determining that the discharge permission flag is cleared, the microcomputer 30 proceeds to process in S340.

In S330, the microcomputer 30 executes a motor driving process by receiving power supply from the battery pack 70 and then terminates this process. The motor driving process will be detailed later.

Meanwhile, in S340, the microcomputer 30 determines whether or not to perform a braking control. Specifically, the microcomputer 30 determines to perform the braking control when the controller 20 is not affected by a braking force generated on the motor 60 while the motor 60 is rotating. In this case, the microcomputer 30 sets a braking flag in S350, and then terminates this process. This stops power supply from the battery pack 70 to the motor 60, and then the short-circuit braking is performed.

The microcomputer 30 determines not to perform the braking control when the motor 60 is not rotating, and when the controller 20 is affected by the braking force generated on the motor 60 while the motor 60 is rotating. In such a case, the microcomputer 30 clears the braking flag in S360, and then terminates this process. This stops power supply from the battery pack 70 to the motor 60. When the motor 60 is rotating, the free running or the like is executed. Then, the present process is terminated.

<1-2-5. Motor Driving Process>

A detailed description will be given of the motor driving process executed by the microcomputer 30 in S330, with reference to the flowchart in FIG. 6.

In S400, the microcomputer 30 executes a command duty ratio setting process. In the present embodiment, the microcomputer 30 executes a Pulse Width Modulation (PWM) control in which a pulse with the set command duty ratio is applied to the windings of the motor 60. The command duty ratio setting process will be detailed later.

In S410, the microcomputer 30 executes a command duty ratio outputting process. Specifically, the microcomputer 30 outputs the command duty ratio set in S400 to the gate circuit 40. Then, the present process is terminated.

<1-2-6. Command Duty Ratio Setting Process>

Figure 7:
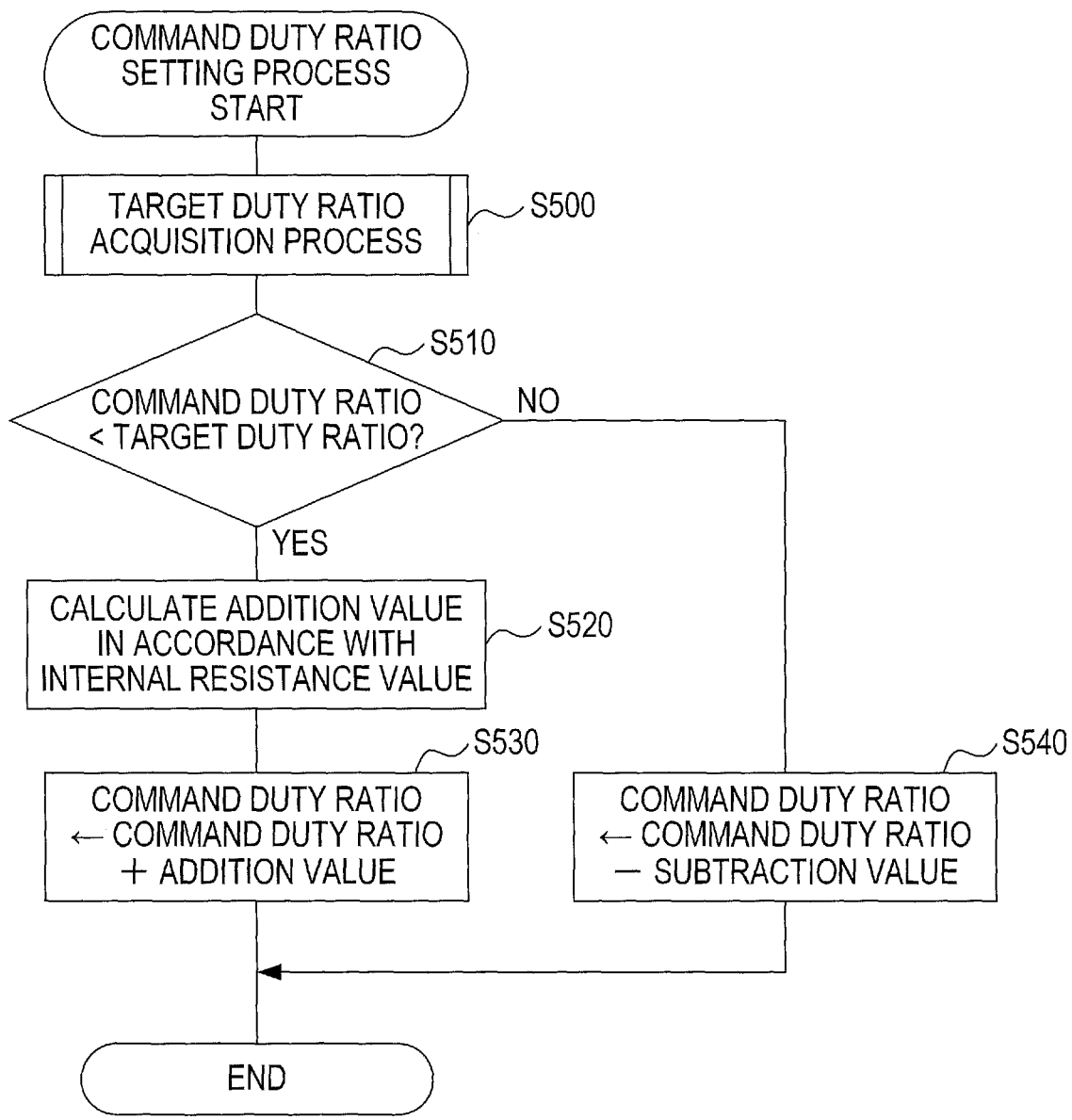
FIG. 7 is a flowchart illustrating a command duty ratio setting process according to the first embodiment.

A detailed description will be given of the command duty ratio setting process executed by the microcomputer 30 in S400, with reference to the flowchart in FIG. 7.

In S500, the microcomputer 30 executes a target duty ratio acquisition process. Specifically, the microcomputer 30 acquires the target duty ratio inputted to the microcomputer 30 via the trigger switch 23.

In the present embodiment, the microcomputer 30 controls driving of the motor 60 so that the command duty ratio achieves the target duty ratio. The microcomputer 30 performs a soft start at a start-up of the motor 60 in order to suppress an inrush-current into the motor 60. The soft start allows a gradual increase in the command duty ratio from zero to the target duty ratio after the trigger switch 23 is switched from OFF to ON. An initial value of the command duty ratio is set to zero. Although the initial value of the command duty ratio is set to zero in the present embodiment, the initial value may not necessarily be zero if the duty ratio is sufficiently low that can suppress the inrush-current.

In S510, the microcomputer 30 determines whether or not the command duty ratio at that point of time is smaller than the target duty ratio acquired in S500. When determining that the command duty ratio is smaller than the target duty ratio in S510, the microcomputer 30 proceeds to process in S520.

In S520, the microcomputer 30 calculates an addition value in accordance with the internal resistance value included in the internal resistance information acquired from the battery pack 70, or, the addition value in accordance with the internal resistance value calculated or estimated from the internal resistance information. The addition value is a value to be added to the command duty ratio at that point of time. A rate of increase in the command duty ratio is increased in accordance with an increase in the addition value.

Figure 8:
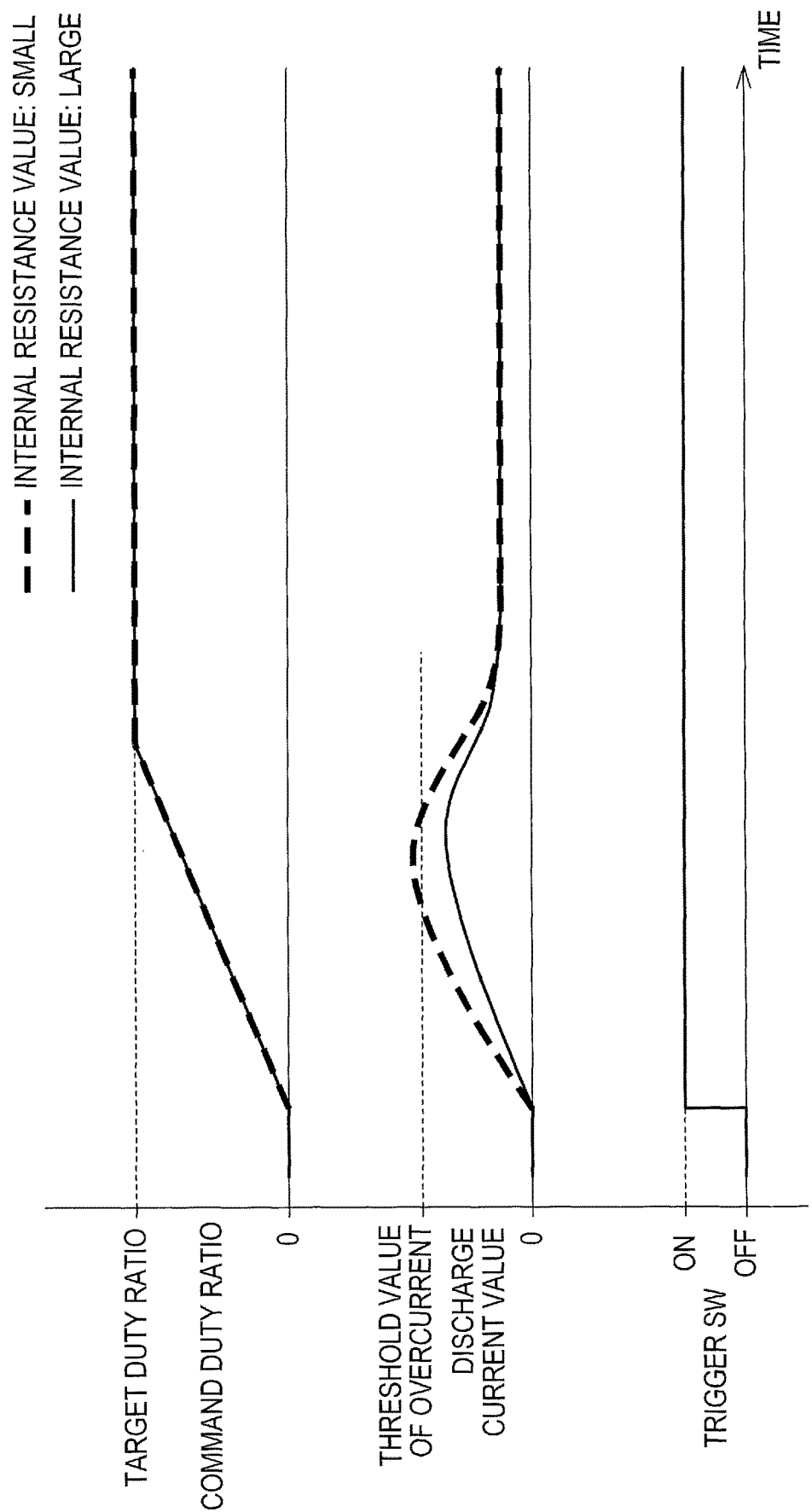
FIG. 8 is a time chart of a command duty ratio, a discharge current value and a trigger switch state when a rate of change in the command duty ratio is set constant.

As shown in FIG. 8, when a term required for the command duty ratio to reach the target duty ratio is set constant in the soft start, voltage applied to the motor 60 is increased in accordance with a decrease in the internal resistance value. Accordingly, the value of the discharge current flowing in the motor 60 is increased in accordance with the decrease in the internal resistance value. Consequently, when the internal resistance value is relatively small, the discharge current value may exceed a threshold value of overcurrent and may result in stopping of the motor 60 in the soft start. The threshold value of overcurrent is, for example, 100 A. The discharge current value is desirably suppressed to 70 to 80 A when the threshold value of overcurrent is 100 A.

The microcomputer 30 changes the term required for the command duty ratio to reach the target duty ratio after the trigger switch 23 is switched from OFF to ON based on the internal resistance value. Specifically, the microcomputer 30 calculates the addition value so that the addition value is decreased in accordance with the decrease in the internal resistance value, thereby setting the rate of increase in the command duty ratio smaller in accordance with the decrease in the internal resistance value. In the present embodiment, the command duty ratio at the start-up of the motor 60 corresponds to one example of the starting parameter of the present disclosure.

In S530, the command duty ratio is updated to a value obtained by adding the addition value to the command duty ratio at that point of time.

Meanwhile, in S510, when determining that the command duty ratio at that point of time exceeds the target duty ratio, the microcomputer 30 proceeds to process in S540.

In S540, the microcomputer 30 updates the command duty ratio to a value obtained by subtracting a subtraction value from the command duty ratio at that point of time. The subtraction value is previously set and is constant regardless of the internal resistance value. That is, in the present embodiment, when the command duty ratio is below the target duty ratio, the rate of increase in the command duty ratio is set smaller in accordance with the decrease in the internal resistance value. On the other hand, when the command duty ratio exceeds the target duty ratio, a rate of decrease in the command duty ratio is set constant regardless of the internal resistance value. Then, the present process is terminated.

<1-3. Operation>

Figure 9:
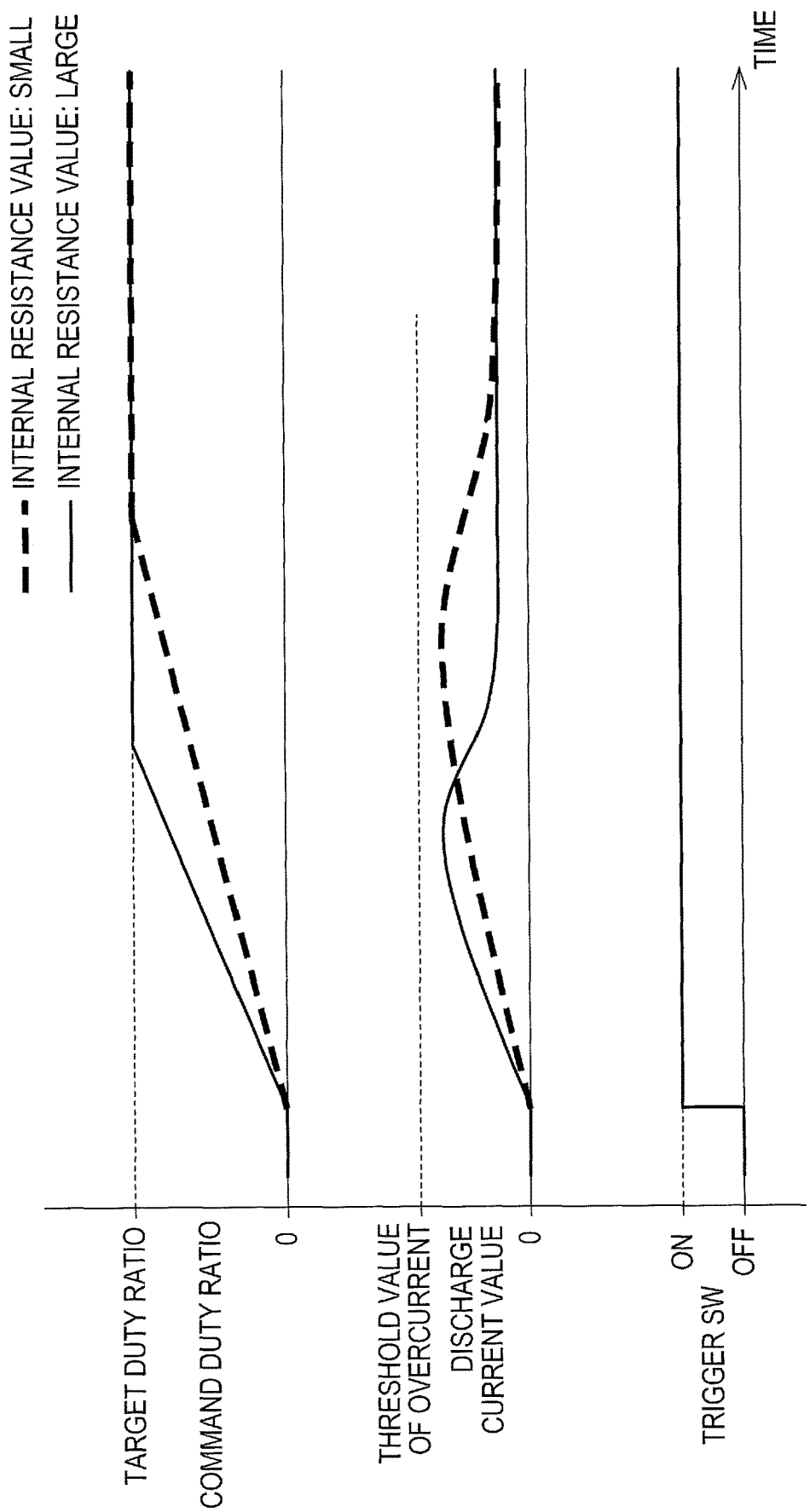
FIG. 9 is a time chart of the command duty ratio, the discharge current value and the trigger switch state according to the first embodiment.

Hereinafter, a description will be given of the command duty ratio and the discharge current value at the start-up of the motor 60 when the microcomputer 30 executes the command duty ratio setting process shown in FIG. 7, with reference to the time chart in FIG. 9.

When the trigger switch 23 is switched from OFF to ON, the command duty ratio and the discharge current value start to increase from zero. In a case where the internal resistance value is relatively small, the rate of increase in the command duty ratio is relatively small and the command duty ratio is increased relatively gradually, compared to a case where the internal resistance value is relatively large. Accordingly, in a case where the internal resistance value is relatively small, the discharge current value is increased relatively gradually, compared to a case where the internal resistance value is relatively large. Consequently, a peak value of the discharge current value is suppressed below the threshold value of overcurrent, not only when the internal resistance value is relatively large but also when the internal resistance value is relatively small.

<1-4. Effects>

According to the above-described first embodiment, the following effects can be obtained.

(1) The internal resistance information of the first, the second battery packs 70A, 70B is acquired and control of the motor 60 is changed based on the internal resistance information acquired. There is a possibility of a delayed start-up of the electric working machine 10, when the battery pack 70A having a relatively large internal resistance value is coupled to the electric working machine 10 in which the control of the motor 60 is adapted to the battery pack 70B having a relatively small internal resistance value. On the other hand, the motor 60 may possibly stop because a current flows too much at a start-up of the electric working machine 10 when the second battery pack 70B having a relatively small internal resistance value is coupled to the electric working machine 10 in which the control of the motor 60 is adapted to the first battery pack 70A having a relatively large internal resistance value. The control of the motor 60 is changed based on the internal resistance information of the first, the second battery packs 70A, 70B, whereby an appropriately operable electric working machine 10 can be achieved.

(2) Control related to the start-up of the motor 60 is changed based on the internal resistance information of the first, the second battery packs 70A, 70B. This can suppress stopping due to overcurrent and the delayed start-up of the motor 60 regardless of the internal resistance values of the first, the second battery packs 70A, 70B, and thus the motor 60 can be appropriately started.

(3) The command duty ratio at the start-up of the motor 60 is set based on the internal resistance information of the first, the second battery packs 70A, 70B, whereby the control related to the start-up of the motor 60 can be changed in accordance with the internal resistance information of the first, the second battery packs 70A, 70B.

(4) The term required for the command duty ratio to reach the target duty ratio is changed based on the internal resistance information, whereby a flow of overcurrent into the motor 60 is suppressed regardless of the internal resistance value.

(5) The rate of increase in the command duty ratio is changed in accordance with the internal resistance value at the start-up of the motor 60, whereby the term required for the command duty ratio to reach the target duty ratio can be changed.

(6) The command duty ratio is set so that the rate of change in the command duty ratio is decreased in accordance with the decrease in the internal resistance value. This can suppress a sharp increase in current value at the start-up of the motor 60 even when the internal resistance value is relatively small. Consequently, overcurrent at the star-up of the motor 60 can be suppressed even when the internal resistance value is relatively small.

Second Embodiment

<2-1. Differences from First Embodiment>

The second embodiment has the same basic configuration as the first embodiment. Thus, description on the common components is not repeated, and the difference will be mainly described. The same reference numerals as those in the first embodiment indicate the same configuration, and the reference of such configuration should be made to the preceding descriptions.

In the first embodiment, the microcomputer 30 controls driving of the motor 60 so that the command duty ratio achieves the target duty ratio. On the other hand, in the second embodiment, the microcomputer 30 executes a constant rotation speed control to control driving of the motor 60 so that the command rotation speed achieves the target rotation speed. This is a difference from the first embodiment. The command rotation speed is a command value of the rotation speed of the motor 60, and is set by the microcomputer 30. The target rotation speed is a target value of the command rotation speed. In the first embodiment, the target duty ratio is inputted to the microcomputer 30 via the trigger switch 23 and such. On the other hand, in the second embodiment, the target rotation speed is inputted to the microcomputer 30 via the trigger switch 23 and such. This is another difference from the first embodiment.

Figure 6:
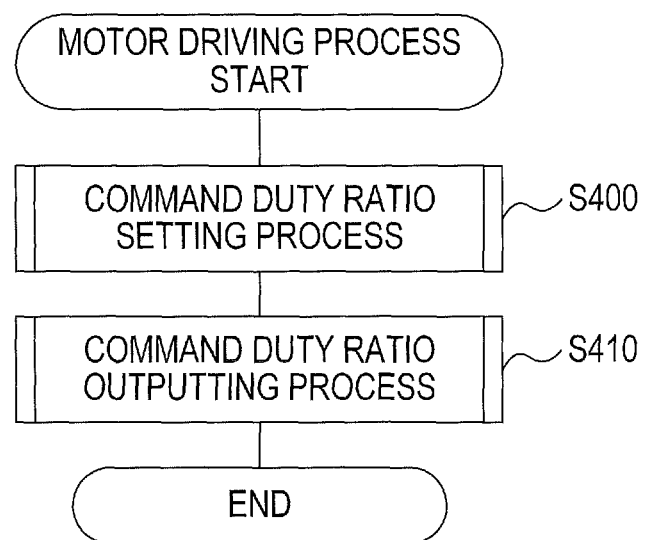
FIG. 6 is a flowchart illustrating a motor driving process according to the first embodiment.
Figure 10:
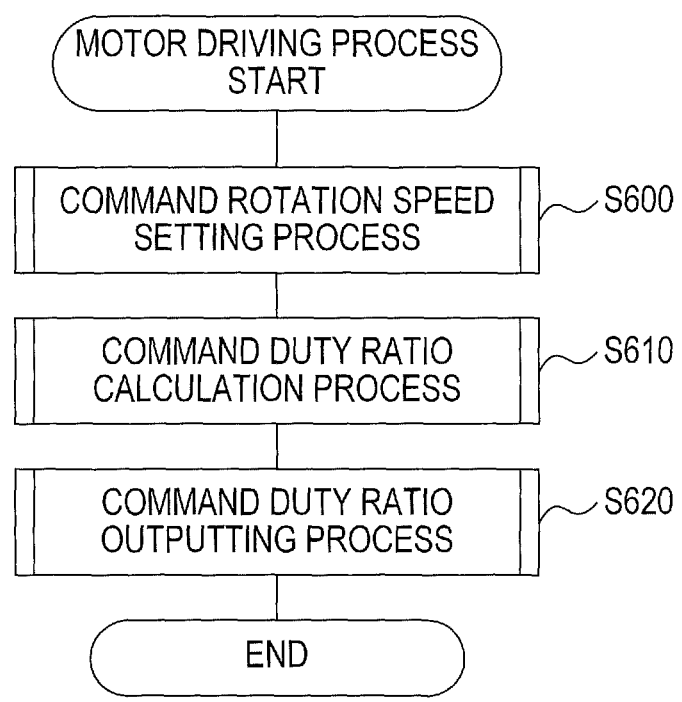
FIG. 10 is a flowchart illustrating a motor driving process according to a second embodiment.

Specifically, the microcomputer 30 according to the second embodiment executes a process shown in the flowchart in FIG. 10 instead of a process shown in the flowchart in FIG. 6 in the motor driving process in S330. The constant rotation speed control is executed in the electric working machine 10, such as a grass cutter, a hammer drill, and a blower, in which the rotation speed is desired not to be reduced when a load is increased. The constant rotation speed control according to the second embodiment and the duty control according to the first embodiment may be switched in accordance with the operation mode.

<2-2. Processes>

<2-2-1. Motor Driving Process>

Hereinafter, a detailed description will be given of the motor driving process executed by the microcomputer 30 in S330, with reference to the flowchart in FIG. 10.

In S600, the microcomputer 30 executes a command rotation speed setting process to set the command rotation speed. The command rotation speed setting process will be detailed later.

In S610, the microcomputer 30 executes a command duty ratio calculation process. Specifically, the microcomputer 30 calculates the command duty ratio based on a difference between the rotation speeds so that an actual rotation speed is consistent with the command rotation speed. The difference between the rotation speeds is a difference between the command rotation speed set in S600 and the actual rotation speed of the motor 60 detected by the rotation speed detection sensor 26. That is to say, the microcomputer 30 performs feedback control of the rotation speed of the motor 60.

In S620, the microcomputer 30 executes a command duty ratio outputting process in the same manner as the process in S410. Then, the present process is terminated.

<2-2-2. Command Rotation Speed Setting Process>

Figure 11:
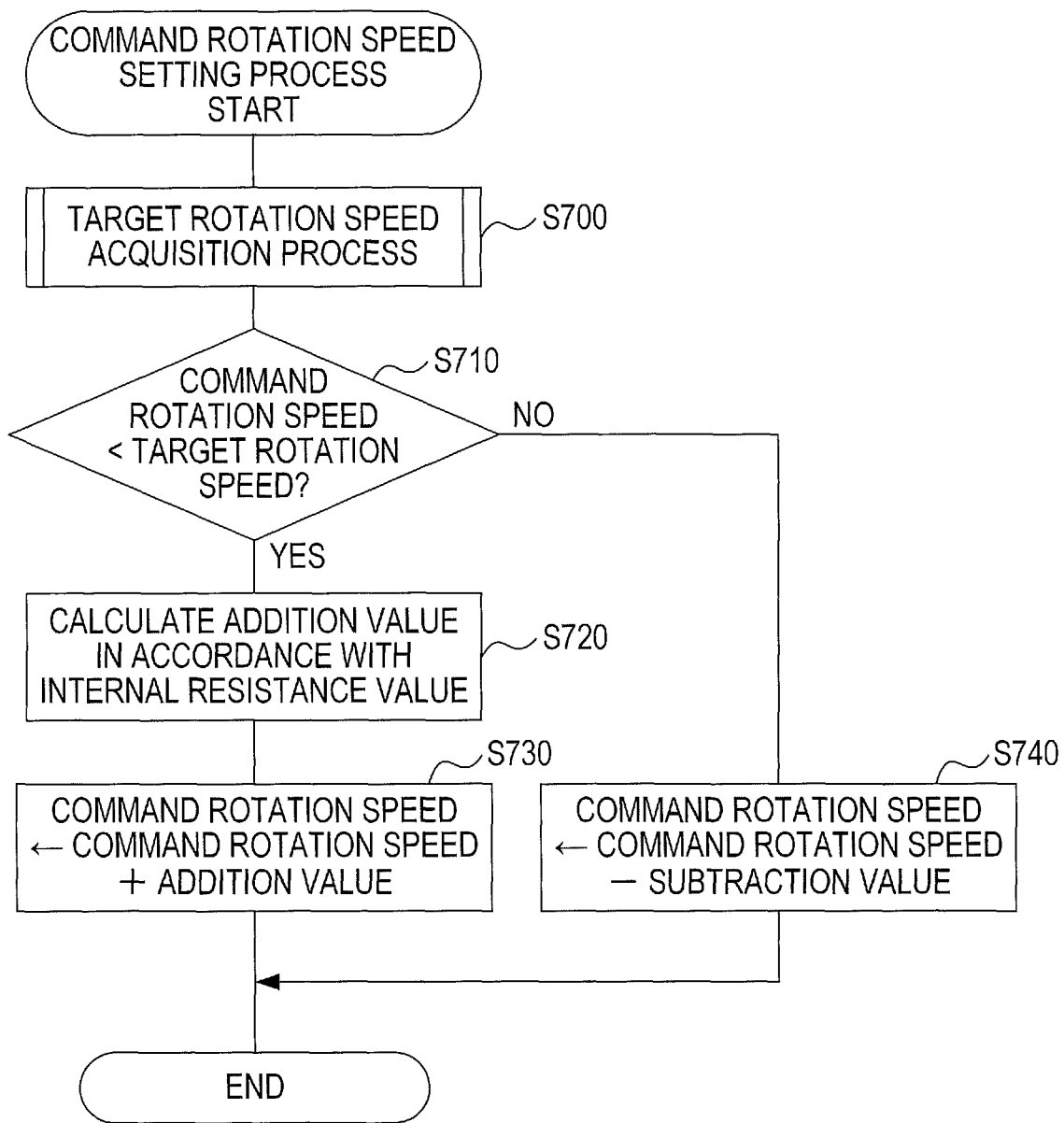
FIG. 11 is a flowchart illustrating a command rotation speed setting process according to the second embodiment.

Hereinafter, a detailed description will be given of the command rotation speed setting process executed by the microcomputer 30 in S600, with reference to the flowchart in FIG. 11.

In S700, the microcomputer 30 executes a target rotation speed acquisition process. Specifically, the microcomputer 30 acquires the target rotation speed inputted to the microcomputer 30 via the trigger switch 23 and such.

In the present embodiment, the microcomputer 30 controls driving of the motor 60 so that the command rotation speed is consistent with the target rotation speed. To start the motor 60, the microcomputer 30 executes the soft start that allows a gradual increase in the command rotation speed from zero to the target rotation speed. An initial value of the command rotation speed is zero. Although the initial value of the command rotation speed is set to zero in the present embodiment, the initial value may not necessarily be zero if the rotation speed is sufficiently low to suppress an inrush-current.

In S710, the microcomputer 30 determines whether or not the command rotation speed at that point of time is smaller than the target rotation speed acquired in S700. When determining that the command rotation speed is smaller than the target rotation speed in S710, the microcomputer 30 proceeds to process in S720.

In S720, the microcomputer 30 calculates an addition value in accordance with the internal resistance value included in the internal resistance information acquired from the battery pack 70, or the addition value in accordance with the internal resistance value calculated or estimated from the internal resistance information. The addition value is a value to be added to the command rotation speed at that point of time. A rate of increase in the command rotation speed is increased in accordance with an increase in the addition value.

Figure 12:
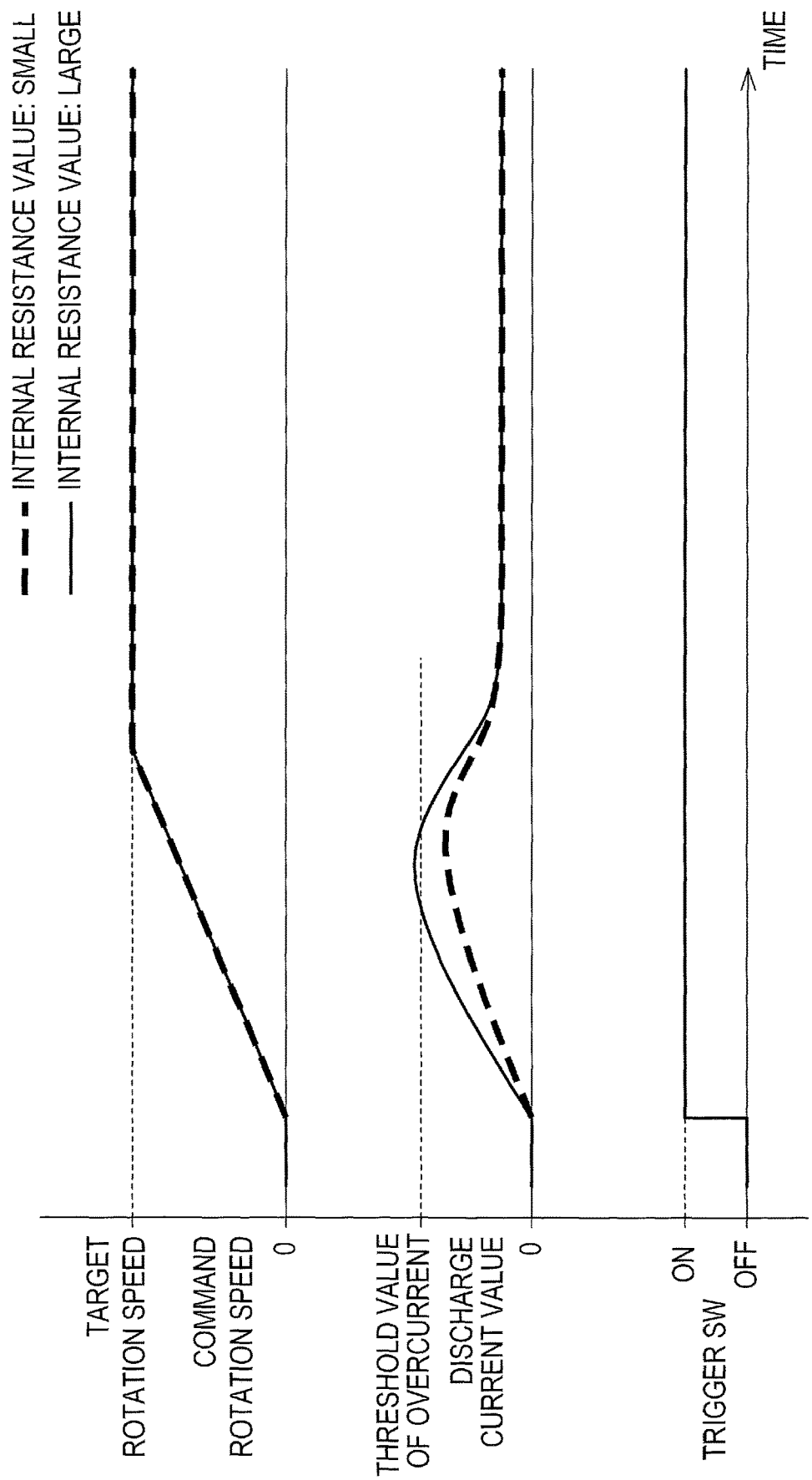
FIG. 12 is a time chart of a command rotation speed, a discharge current value and a trigger switch state when the rate of change in the command rotation speed is set constant.

As shown in FIG. 12, when a term required for the command rotation speed to reach the target rotation speed is set constant in the soft start, a voltage drop in the battery pack 70 is increased in accordance with an increase in the internal resistance value. Accordingly, the value of the discharge current flowing in the motor 60 is increased in accordance with the increase in the internal resistance value. Consequently, when the internal resistance value is relatively large, the discharge current value may exceed a threshold value of overcurrent in the soft start and may result in stopping of the motor 60.

The microcomputer 30 then changes the term required for the command rotation speed to reach the target rotation speed based on the internal resistance value after the trigger switch 23 is switched from OFF to ON. Specifically, the microcomputer 30 calculates the addition value so that the addition value is decreased in accordance with the increase in the internal resistance value. In this way, the microcomputer 30 sets the rate of change in the command rotation speed smaller in accordance with the increase in the internal resistance value. In the present embodiment, the command rotation speed at the start-up of the motor 60 corresponds to one example of a startup parameter.

In S730, the command rotation speed is updated to a value obtained by adding the addition value to the command rotation speed at that point of time.

Meanwhile, in S710, when determining that the command rotation speed at that point of time exceeds the target rotation speed, the microcomputer 30 proceeds to process in S740.

In S740, the microcomputer 30 updates the command rotation speed to a value obtained by subtracting a subtraction value from the command rotation speed at that point of time. The subtraction value is previously set and is constant regardless of the internal resistance value. That is, in the present embodiment, when the command rotation speed is below the target rotation speed, the rate of increase in the command rotation speed is set smaller in accordance with the increase in the internal resistance value. On the other hand, when the command rotation speed exceeds the target rotation speed, a decreasing ratio of the command rotation speed is set constant regardless of the internal resistance value. Then, the present process is terminated.

<2-3. Operation>

Figure 13:
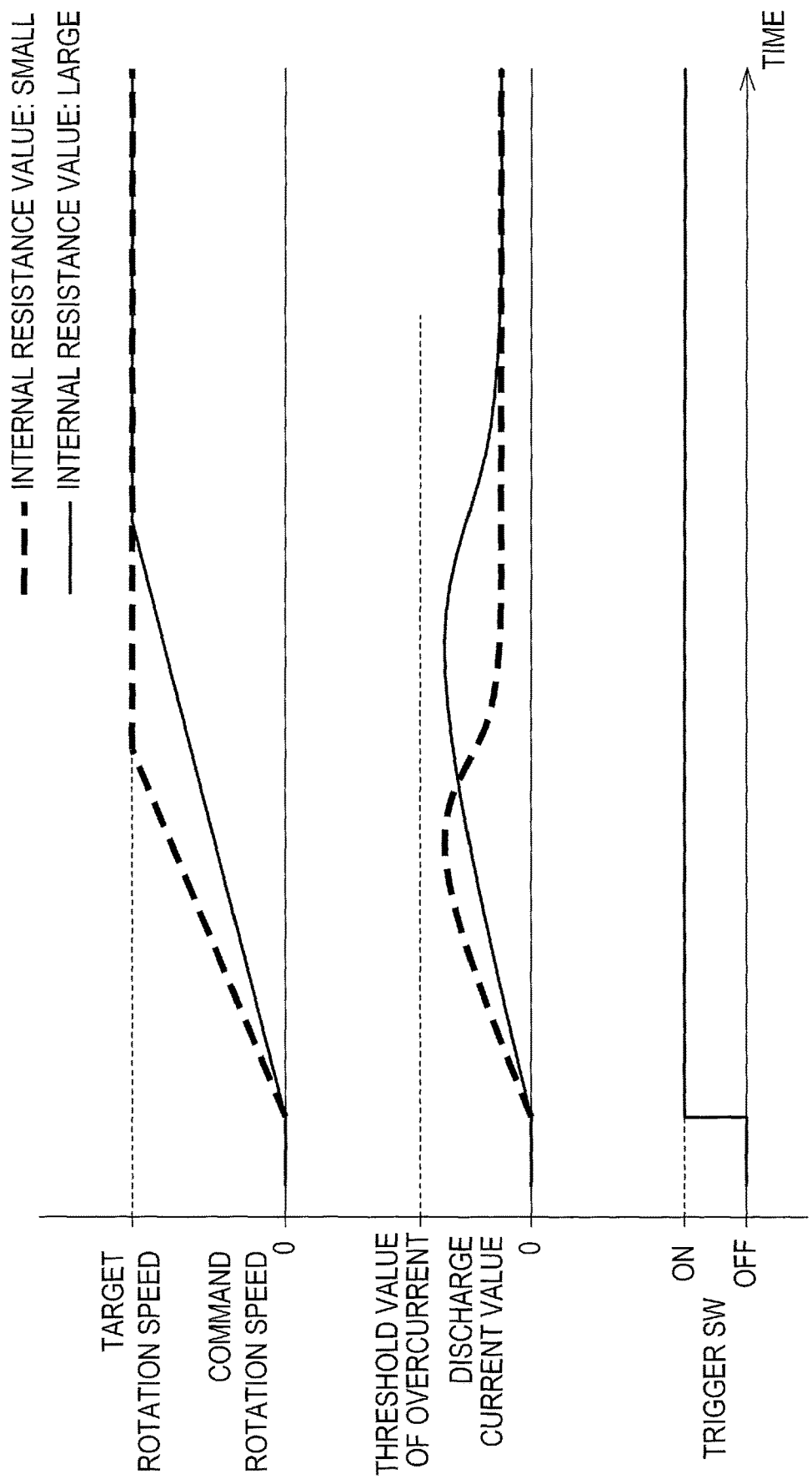
FIG. 13 is a time chart of the command rotation speed, the discharge current value and the state of the trigger switch state according to the second embodiment.

Hereinafter, a description will be given of the command rotation speed and the discharge current value at the start-up of the motor 60 when the microcomputer 30 executes the command rotation speed setting process shown in FIG. 11, with reference to the flowchart in FIG. 13.

In a case where the trigger switch 23 is switched from OFF to ON, the command rotation speed and the discharge current value start to be increased from zero. In the internal resistance value is relatively large, the rate of increase in the command rotation speed is relatively small and the command rotation speed is increased relatively gradually, compared to a case where the internal resistance value is relatively small. Accordingly, in a case where the internal resistance value is relatively large, the discharge current value is increased relatively gradually compared to a case where the internal resistance value is relatively small. Consequently, the peak value of the discharge current value is suppressed below the threshold value of overcurrent, not only when the internal resistance value is relatively small but also when the internal resistance value is relatively large.

<2-4. Effects>

According to the above-described second embodiment, the following effects in addition to effects (1) and (2) of the first embodiment can be obtained.

(7) The command rotation speed at the start-up of the motor 60 is set based on the internal resistance information of the first, the second battery packs 70A, 70B, whereby the control related to the start-up of the motor 60 can be changed in accordance with the internal resistance information of the first, the second battery packs 70A, 70B.

(8) The term required for the command rotation speed to reach the target rotation speed is changed based on the internal resistance information, whereby a flow of overcurrent into the motor 60 is suppressed regardless of the internal resistance value.

(9) The rate of increase in the command rotation speed is changed in accordance with the internal resistance value at the start-up of the motor 60, whereby the term required for the command rotation speed to reach the target rotation speed can be changed.

(10) The command rotation speed is set so that the rate of change in the command rotation speed is decreased in accordance with the increase in the internal resistance value. This can suppress a sharp increase in discharge current value at the start-up of the motor 60 even when the internal resistance value is relatively large. Consequently, overcurrent at the star-up of the motor 60 can be suppressed even when the internal resistance value is relatively large.

Third Embodiment

<3-1. Differences from Second Embodiment>

The third embodiment has the same basic configuration as the second embodiment. Thus, description on the common components is not repeated, and the difference will be mainly described. The same reference numerals as those in the second embodiment indicate the same configuration, and the reference of such configuration should be made to the preceding descriptions.

In the third embodiment, the microcomputer 30 performs the control related to output restriction of the motor 60 in addition to the processes of the second embodiment. This is a difference from the second embodiment. Specifically, the microcomputer 30 according to the third embodiment executes a process shown in the flowchart in FIG. 14 instead of a process shown in the flowchart in FIG. 10 in the motor driving process in S330.

<3-2. Process>

<3-2-1. Motor Driving Process>

Figure 14:
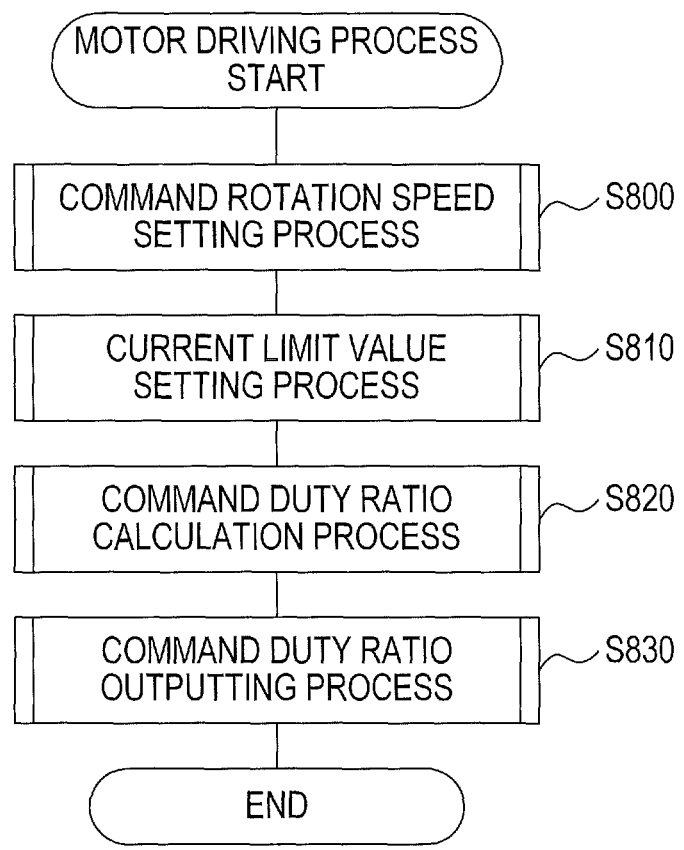
FIG. 14 is a flowchart illustrating a motor driving process according to a third embodiment.

Hereinafter, a detailed description will be given of the motor driving process executed by the microcomputer 30 in S330, with reference to the flowchart in FIG. 14.

In S800, the microcomputer 30 executes the same process as in S600.

In S810, the microcomputer 30 executes a current limit value setting process. The current limit value setting process will be detailed later.

In S820, the microcomputer 30 executes a command duty ratio calculation process. Specifically, the microcomputer 30 calculates the command duty ratio so that: (I) the actual rotation speed is consistent with the command rotation speed; and (II) the value of discharge current flowing from the battery pack 70 to the electric working machine 10 is equal to or below the current limit value set in S810. If it is impossible that both of conditions described as (I) and (II) are satisfied, the microcomputer 30 calculates the command duty ratio so that the actual rotation speed and the command rotation speed are as close as possible while satisfying the condition (II), which has higher priority than the condition (I).

In S830, the microcomputer 30 executes a command duty ratio outputting process in the same manner as the process in S410. Then, the present process is terminated.

<3-2-2. Current Limit Value Setting Process>

Figure 15:
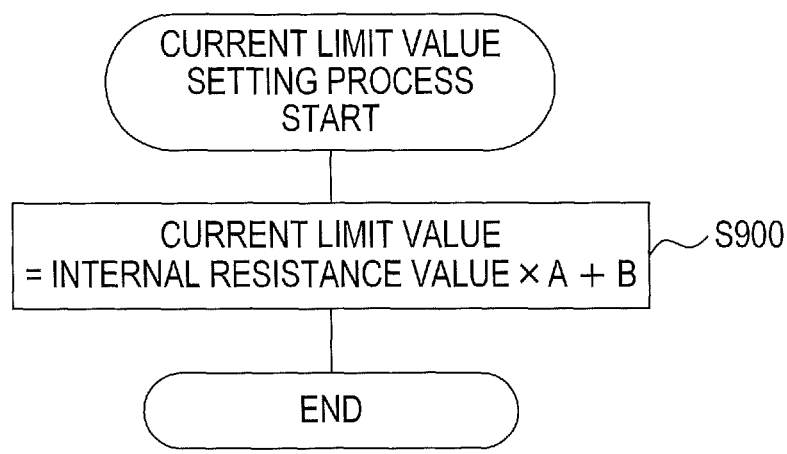
FIG. 15 is a flowchart illustrating a current limit value setting process according to the third embodiment.

Hereinafter, a detailed description will be given of the current limit value setting process executed by the microcomputer 30 in S810, with reference to the flowchart in FIG. 15.

Figure 16:
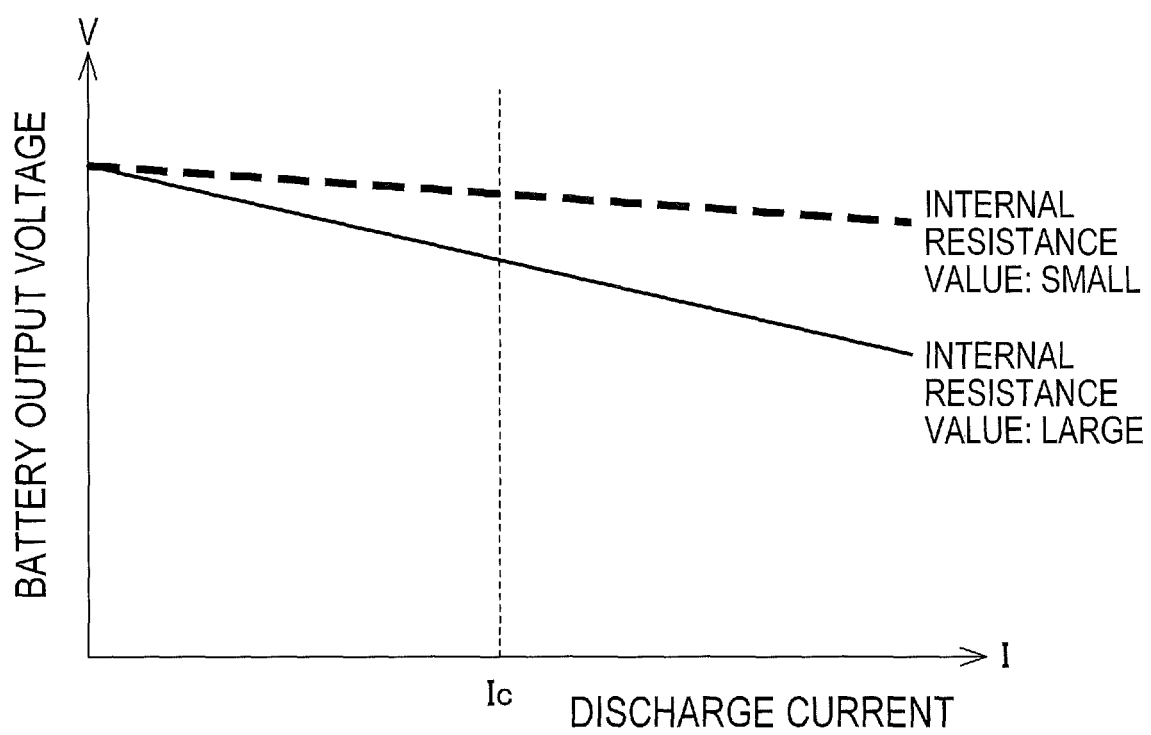
FIG. 16 is a view showing a relationship among an internal resistance of the battery, a battery output voltage and a discharge current.

In S900, the microcomputer 30 sets the current limit value in accordance with the internal resistance value of the battery pack 70. As shown in FIG. 16, when the value of discharge current flowing from the battery pack 70 to the electric working machine 10 is set constant, an output voltage value of the battery pack 70 is increased in accordance with the decrease in the internal resistance value, and output of the motor 60 is increased in accordance with the decrease in the internal resistance value.

The microcomputer 30 then sets the current limit value so that the current limit value is decreased in accordance with the decrease in the internal resistance value, whereby output of the motor 60 is not increased when the internal resistance value is relatively small compared to a case where the internal resistance value is relatively large. For example, the current limit value is obtained by calculating an expression "the internal resistance value×A+B". Coefficients A and B are positive integers. Then, the present process is terminated.

<3-3. Another Example of Third Embodiment>

Subsequently, another example of the third embodiment will be described with reference to FIGS. 17 to 20. In another example of the third embodiment, the microcomputer 30 performs authentication of the battery pack 70 via serial communication terminals 14A, 14B when the battery pack 70 is coupled to the electric working machine 10. Any authentication method may be used to authenticate the battery pack 70. For example, the microcomputer 30 transmits a generated authentication code to the battery pack 70, and receives a calculation result calculated by the battery pack 70 using the received authentication code. Then, the microcomputer 30 authenticates the battery pack 70 when a calculation result calculated by itself using the authentication code is identical with the calculation result received from the battery pack 70.

The microcomputer 30 sets control parameter of the motor 60 so as to restrict output of the motor 60 more in cases during authentication and where authentication is failed than a case where authentication is successful.

Figure 17:
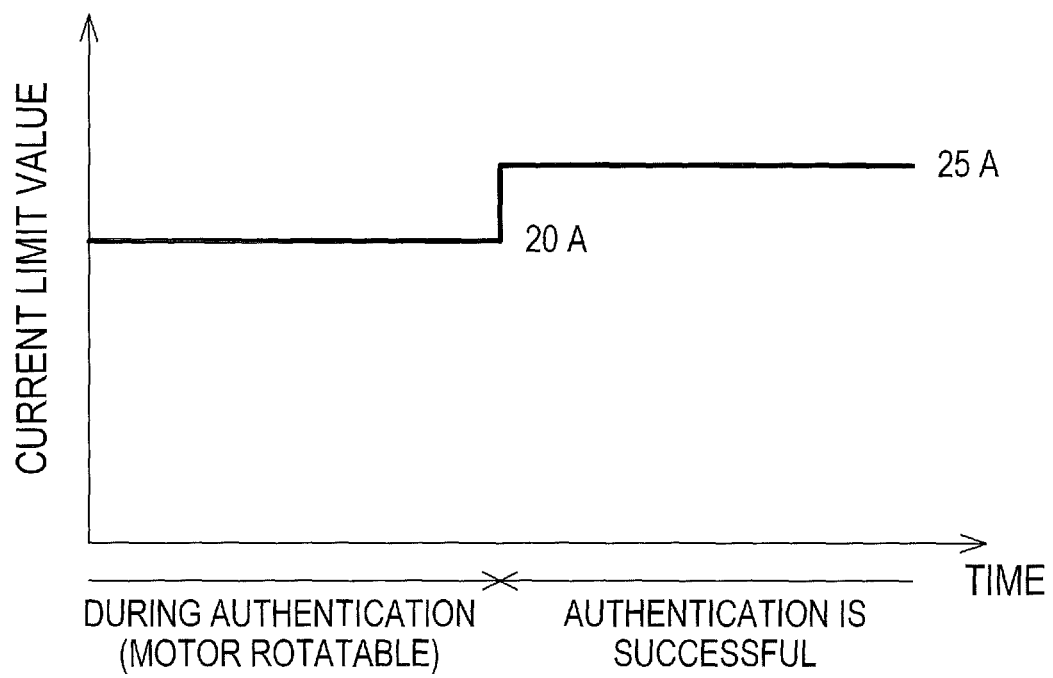
FIG. 17 is a view showing a current limit value used in each of cases of during authentication and where authentication is successful according to the third embodiment.

Specifically, as shown in FIG. 17, the microcomputer 30 sets in S810 the current limit value smaller in a case during authentication of the battery pack 70 than a case where authentication of the battery pack 70 is successful. For example, the current limit value is set to 25A when authentication is successful, and the current limit value is set to 20A during authentication, regardless of the internal resistance value. A state referred to as "during authentication" here corresponds to a state where authentication process by the microcomputer 30 is being executed, and a result on whether the authentication is successful or failed has not come out. During authentication, the motor 60 is rotatable by receiving power supply from the battery pack 70.

Figure 18:
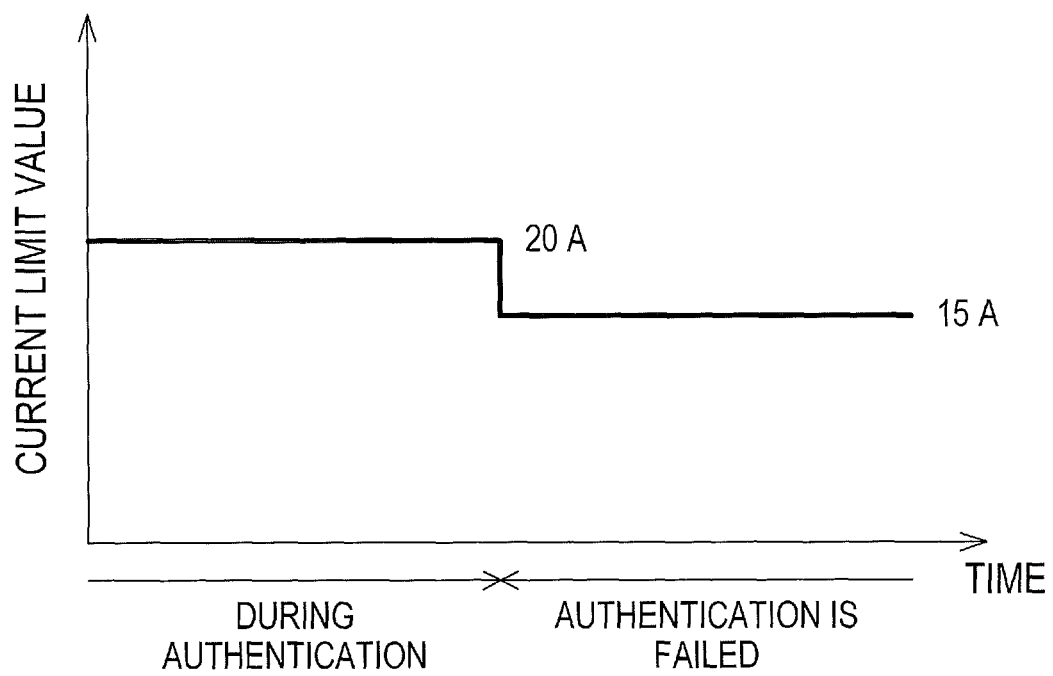
FIG. 18 is a view showing a current limit value used in each of cases of during authentication and where authentication is failed according to the third embodiment.

As shown in FIG. 18, the microcomputer 30 sets the current limit value further smaller in a case where authentication of the battery pack 70 is failed than a case during authentication of the battery pack 70. For example, the microcomputer 30 sets the current limit value to 15A when authentication is failed regardless of the internal resistance value.

The microcomputer 30 may set the current limit value in accordance with the internal resistance value in each of cases where authentication is successful, during authentication, and where authentication is failed. In these cases, for example, the coefficients A and B are set to smaller values in the case during authentication than in the case where authentication is successful, and the coefficients A and B are set to even smaller values in the case where authentication is failed than in the case during authentication.

Further, the microcomputer 30 may change the internal resistance values of the battery pack 70 to be used for each of the cases where authentication is successful, during authentication and where authentication is failed. For example, as shown in FIG. 19, the microcomputer 30 uses the internal resistance value acquired from the battery pack 70 via serial communication when authentication is successful. The acquired internal resistance value is normally 200 mΩ or more. On the other hand, the microcomputer 30, during authentication or when authentication is failed, uses the lowest internal resistance value, which is lower than an internal resistance value that can be acquired from the battery pack 70. The lowest internal resistance value is, for example, 150 mΩ.

Further, the microcomputer 30 may set the current limit value in accordance with a state of the battery pack 70. Specifically, the microcomputer 30 calculates the overload counter value by accumulating count variations in accordance with the discharge current value at a specified cycle using the overload map shown in FIG. 20. The microcomputer 30 sets the current limit value smaller when the overload counter value exceeds a previously-set counter threshold value than a case where the overload counter value is below the counter threshold value.

At this time, the microcomputer 30 may use different overload maps for each of cases where authentication is successful, during authentication and where authentication is failed. For example, as shown in FIG. 19, the microcomputer 30 uses the overload map received from the battery pack 70 via serial communication when authentication is successful.

Figure 20:
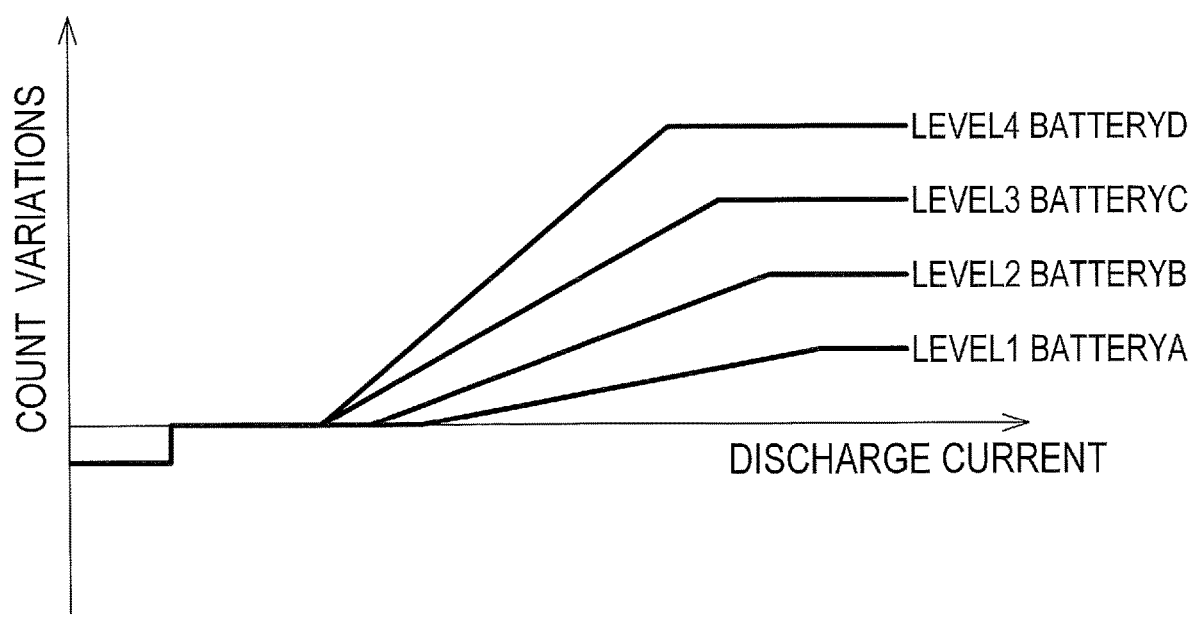
FIG. 20 is a view showing an example of the overload map according to the third embodiment.

As shown in FIG. 20, the battery pack 70 is provided with the overload maps for battery types. The overload maps are provided for different count variations with respect to the same discharge current value according to performance of the battery pack 70.

The microcomputer 30, when authentication is successful, acquires the overload map from the battery pack 70 via serial communication.

The microcomputer 30, during authentication, uses the overload map for during authentication previously set in the microcomputer 30. Also, the microcomputer 30, when authentication is failed, uses the overload map that is previously set in the microcomputer 30 and is capable of stopping the motor 60 the most quickly.

The microcomputer 30 may change the threshold value of overcurrent in accordance with each of cases where authentication is successful, during authentication and where authentication is failed. For example, as shown in FIG. 19, the microcomputer 30, when authentication is successful, uses the threshold value of overcurrent acquired from the battery pack 70 via serial communication. Normally, the acquired threshold value of overcurrent is 200 A or more. On the other hand, the microcomputer 30, during authentication or when authentication is failed, uses the lowest threshold value of overcurrent, which is lower than a threshold value of overcurrent that can be acquired from the battery pack 70. The lowest threshold value of overcurrent is, for example, 80A.

<3-4. Effects>

According to the third embodiment, the following effects in addition to effects (1) to (2), and (7) to (10) of the first embodiment can be obtained.

(11) The control related to output restriction of the motor 60 is changed based on the internal resistance values of the first, the second battery packs 70A, 70B. In this way, output of the motor 60 can be appropriately controlled regardless of the internal resistance value.

(12) The current limit value is set so that the current limit value is decreased in accordance with the decrease in the internal resistance value, whereby output of the motor can be controlled constant regardless of the internal resistance values of the first, the second battery packs 70A, 70B.

Other Embodiments

Although some embodiments of the present disclosure have been described above, it is to be understood that the present disclosure is not limited to the above-described embodiments, but may be implemented in various forms.

(a) Although the aforementioned embodiments exemplify the first, the second battery packs 70A, 70B including one battery block 80 or two battery blocks 80 coupled in parallel, to be coupled to the electric working machine 10, the battery pack is not limited to these. The battery pack coupled to the electric working machine 10 may be a battery pack including three or more battery blocks 80 coupled in parallel.

(b) The microcomputer 30 and the control circuit 75 may include a combination of a variety of individual electrical components instead of a microcomputer or in addition to a microcomputer, or may include an Application Specified Integrated Circuit (ASIC), an Application Specific Standard Product (ASSP), a programmable logic device such as a Field Programmable Gate Array (FPGA), or a combination of these.

(c) Two or more functions performed by a single element in the aforementioned embodiments may be achieved by two or more elements, or a function performed by a single element may be achieved by two or more elements. Also, two or more functions performed by two or more elements may be achieved by a single element, or a function performed by two or more elements may be achieved by a single element. Also, a part of a configuration in one of the aforementioned embodiments may be omitted. Further, at least a part of a configuration in one of the aforementioned embodiments may be added to, or may be replaced with, a configuration in another one of the aforementioned embodiments.

(c) In addition to the electric working machine described above, the present disclosure can be realized in various forms such as a system including the electric working machine as a component, a program for enabling the controller 20, a non-transitory tangible storage medium, e.g. a semiconductor memory storing the program, and a motor control method.

What is claimed is:

1. An electric working machine comprising:
 a housing configured to accommodate a battery pack therein, and including a first terminal and a second terminal;
 a motor in the housing;
 a motor drive circuit configured to control a discharge current, the discharge current flowing from the battery pack to the motor via the first terminal; and
 a controller configured to:
  receive an internal resistance information via the second terminal, the internal resistance information being related to an internal resistance value of the battery pack;
  acquire the internal resistance value based on the internal resistance information received;
  control the motor drive circuit to limit a magnitude of the discharge current to a limit value or lower;
  set the limit value to be smaller as the internal resistance value decreases;
  perform authentication of the battery pack via the second terminal;
  set the limit value to a first value in response to the authentication having succeeded;
  set the limit value to a second value during the authentication, the second value being smaller than the first value; and
  set the limit value to a third value in response to the authentication having failed, the third value being smaller than the second value.

2. The electric working machine according to claim 1, wherein
the controller is configured to set a startup parameter based on the internal resistance information, the startup parameter being related a start-up of the motor.

3. The electric working machine according to claim 2, further comprising a manual switch configured to be turned on or off by a user for driving the motor, wherein
the startup parameter includes a first rate of change, and
the controller is configured to:
decrease the first rate of change in accordance with an increase in the internal resistance value;
increase a command rotation speed to a target rotation speed at the first rate of change in response to switching of the manual switch to ON; and
control the motor drive circuit to adjust an actual rotation speed of the motor to be consistent with the command rotation speed.

4. An electric working machine comprising:
a housing configured to accommodate a battery pack therein, and including a first terminal and a second terminal;
a motor in the housing;
a motor drive circuit configured to control a discharge current, the discharge current flowing from the battery pack to the motor via the first terminal; and
a controller configured to:
receive an internal resistance information via the second terminal, the internal resistance information being related to an internal resistance value of the battery pack;
acquire the internal resistance value based on the internal resistance information received;
control the motor drive circuit to limit a magnitude of the discharge current to a limit value or lower;
set the limit value to be smaller as the internal resistance value decreases;
perform an initial communication process to receive the internal resistance information from the battery pack via the second terminal; and
receive, subsequent to performing the initial communication process, temperature and remaining energy of the battery pack via the second terminal at a specified cycle.

5. The electric working machine according to claim 4, wherein
the housing further includes a third terminal, and
the initial communication process includes:
receiving the internal resistance information via the second terminal by a serial communication; and
transmitting information of the electric working machine via the third terminal by the serial communication.

6. A motor control method for an electric working machine, the method comprising:
receiving an internal resistance information of a battery pack connected to the electric working machine, the internal resistance information being related to an internal resistance value of the battery pack;
acquiring the internal resistance value based on the internal resistance information;
limiting a discharge current value to a limit value or lower, the discharge current flowing from the battery pack to the motor;
decreasing the limit value as the internal resistance value decreases;
performing authentication of the battery pack;
setting the limit value to a first value in response to the authentication having succeeded;
setting the limit value to a second value during the authentication, the second value being smaller than the first value; and
setting the limit value to a third value in response to the authentication having failed, the third value being smaller than the second value.

7. The electric working machine according to claim 4, wherein
the controller is configured to set a startup parameter based on the internal resistance information, the startup parameter being related a start-up of the motor.

8. The electric working machine according to claim 7, further comprising a manual switch configured to be turned on or off by a user for driving the motor, wherein
the startup parameter includes a first rate of change, and
the controller is configured to:
decrease the first rate of change in accordance with an increase in the internal resistance value;
increase a command rotation speed to a target rotation speed at the first rate of change in response to switching of the manual switch to ON; and
control the motor drive circuit to adjust an actual rotation speed of the motor to be consistent with the command rotation speed.

* * * * *